(12) United States Patent
Dunn et al.

(10) Patent No.: US 7,680,555 B2
(45) Date of Patent: Mar. 16, 2010

(54) AUTO TIP CALIBRATION IN AN EXTRUSION APPARATUS

(75) Inventors: Benjamin N. Dunn, Savage, MN (US); James W. Comb, Hamel, MN (US); Hans P. Erickson, Eagan, MN (US); Jason P. Wanzek, Bloomington, MN (US)

(73) Assignee: Stratasys, Inc., Eden Prairie, MN (US)

( * ) Notice: Subject to any disclaimer, the term of this patent is extended or adjusted under 35 U.S.C. 154(b) by 434 days.

(21) Appl. No.: 11/397,012

(22) Filed: Apr. 3, 2006

(65) Prior Publication Data

US 2007/0228592 A1 Oct. 4, 2007

(51) Int. Cl.
*G06F 19/00* (2006.01)
*G01R 35/00* (2006.01)
*G01B 5/00* (2006.01)

(52) U.S. Cl. .................. 700/119; 702/87; 33/613

(58) Field of Classification Search .......... 700/119, 700/196; 264/40.4, 113; 702/87; 33/613
See application file for complete search history.

(56) References Cited

U.S. PATENT DOCUMENTS

| | | | |
|---|---|---|---|
| 4,158,919 A * | 6/1979 | McMurtry | 33/556 |
| 4,333,238 A * | 6/1982 | McMurtry | 33/504 |
| 5,121,329 A | 6/1992 | Crump | |
| 5,263,130 A | 11/1993 | Pomerantz et al. | |
| 5,303,141 A | 4/1994 | Batchelder et al. | |
| 5,340,433 A | 8/1994 | Crump | |
| 5,402,351 A | 3/1995 | Batchelder et al. | |
| 5,426,722 A | 6/1995 | Batchelder | |
| 5,503,785 A | 4/1996 | Crump et al. | |
| 5,695,707 A | 12/1997 | Almquist et al. | |
| 5,866,058 A | 2/1999 | Batchelder et al. | |
| 5,902,537 A * | 5/1999 | Almquist et al. | 264/401 |
| 5,939,008 A | 8/1999 | Comb et al. | |
| 5,943,235 A | 8/1999 | Earl et al. | |
| 5,968,561 A | 10/1999 | Batchelder et al. | |
| 6,004,124 A | 12/1999 | Swanson et al. | |
| 6,022,207 A | 2/2000 | Dahlin et al. | |
| 6,028,410 A | 2/2000 | Leavitt et al. | |

(Continued)

FOREIGN PATENT DOCUMENTS

WO   WO 2004/024447 A2  *  3/2004

OTHER PUBLICATIONS

International Search Report and Written Opinion of PCT/US2007/06437 filed Mar. 15, 2007.

*Primary Examiner*—Ryan A Jarrett
(74) *Attorney, Agent, or Firm*—Westman, Champlin & Kelly, P.A.

(57) ABSTRACT

The present invention is a method for performing a calibration routine of a deposition device in a three-dimensional modeling machine that deposits a material to build up three-dimensional objects as directed by a controller on a substrate mounted on a platform. The method comprises generating a material build profile, which represents a three-dimensional structure at defined locations. A relative position of the material build profile is then determined. An expected build profile is identified and then compared to the determined relative position of the material build profile to identify any difference which represents an offset. The modeling system then positions the deposition device based upon the offset.

20 Claims, 15 Drawing Sheets

U.S. PATENT DOCUMENTS

| | | |
|---|---|---|
| 6,054,077 A | 4/2000 | Comb et al. |
| 6,085,957 A | 7/2000 | Zinniel et al. |
| 6,129,872 A | 10/2000 | Jang |
| 6,228,923 B1 | 5/2001 | Lombardi et al. |
| 6,367,791 B1 | 4/2002 | Calderon et al. |
| 6,578,596 B1 | 6/2003 | Batchelder et al. |
| 6,629,011 B1 | 9/2003 | Calderon et al. |
| 6,645,412 B2 | 11/2003 | Priedeman, Jr. et al. |
| 6,685,866 B2 | 2/2004 | Swanson et al. |
| 6,722,872 B1 | 4/2004 | Swanson et al. |
| 6,749,414 B1 | 6/2004 | Hanson et al. |
| D514,913 S | 2/2006 | Dunn et al. |
| 2003/0031816 A1* | 2/2003 | Topp .................. 428/36.5 |
| 2004/0186608 A1* | 9/2004 | Hiatt et al. .................. 700/120 |
| 2005/0173855 A1 | 8/2005 | Dunn et al. |
| 2006/0111807 A1* | 5/2006 | Gothait et al. .............. 700/119 |

* cited by examiner

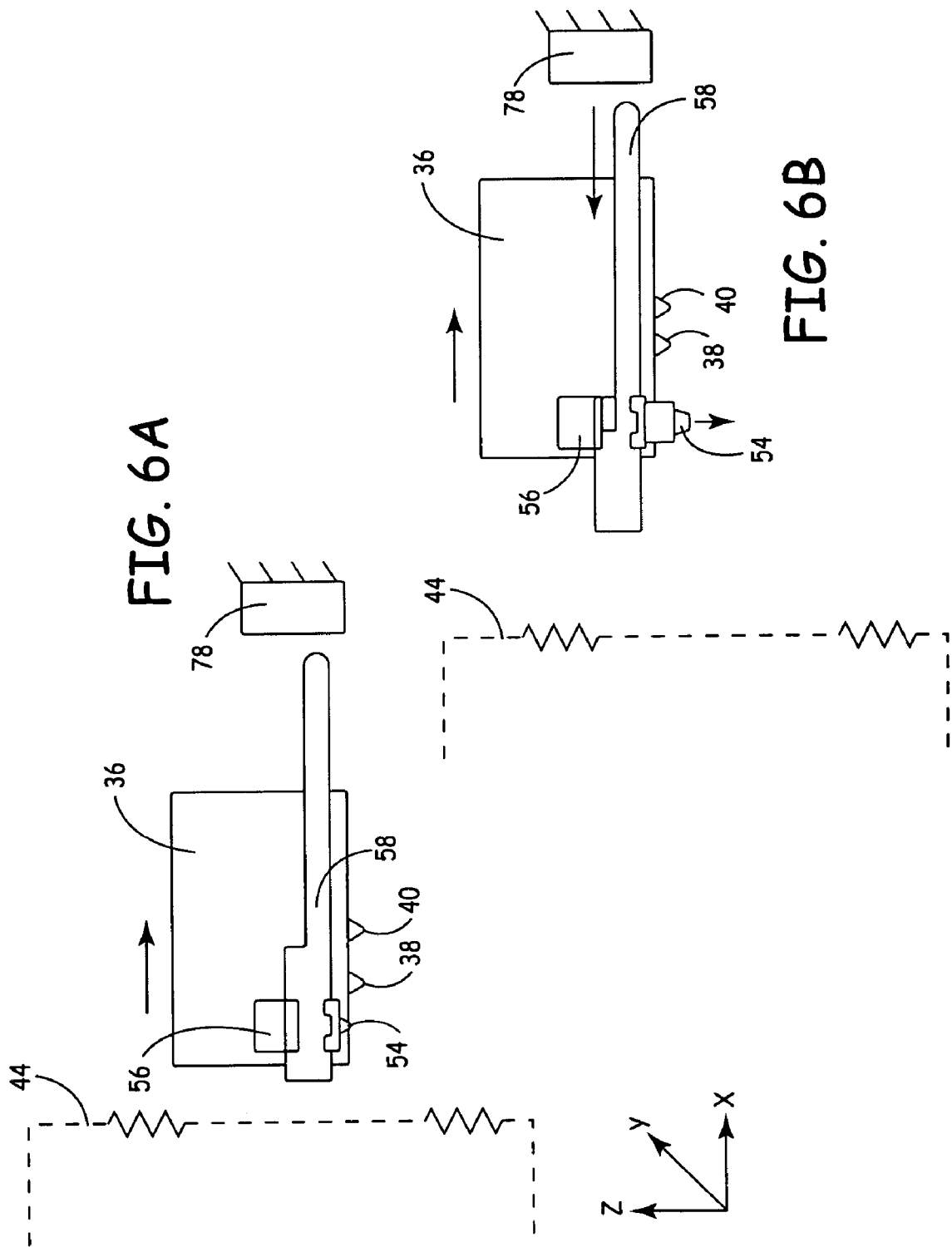

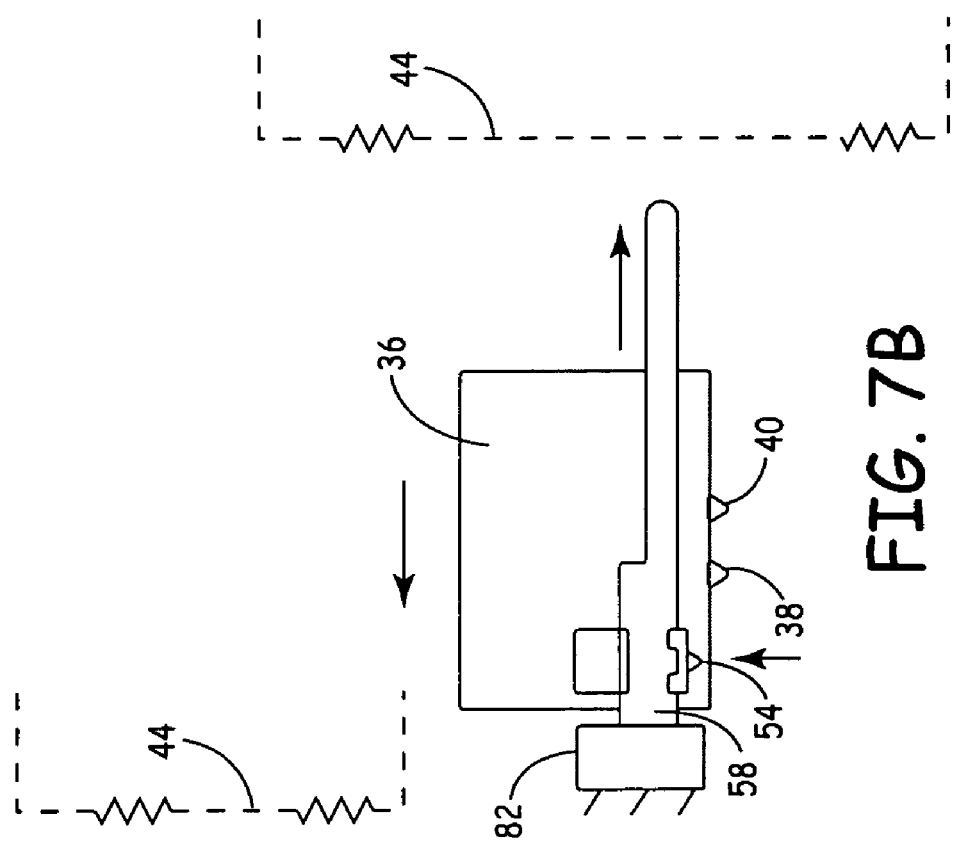

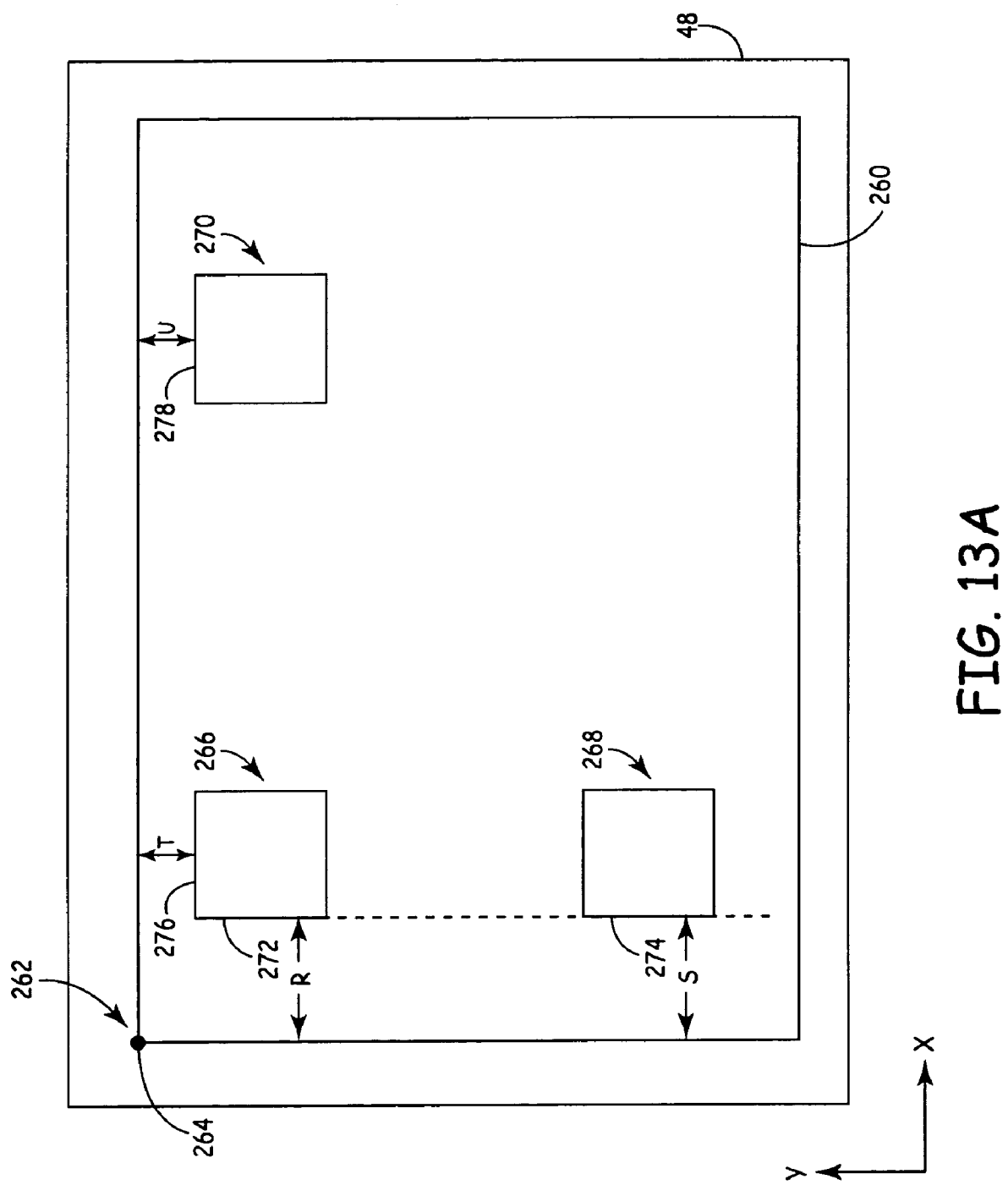

AUTO TIP CALIBRATION IN AN EXTRUSION APPARATUS

CROSS-REFERENCE TO RELATED APPLICATION(S)

None.

BACKGROUND OF THE INVENTION

The present invention relates to the fabrication of three-dimensional objects using additive process modeling techniques. More particularly, the invention relates to a method for calibrating extrusion tips in a three-dimensional modeling machine.

Additive process modeling machines make three-dimensional models by building up a modeling medium, usually in planar layers, based upon design data provided from a computer aided design (CAD) system. A mathematical description of a physical part to be created is usually split into planar layers, and those layers are individually shaped and applied to produce the final part. Three-dimensional models are used for functions including aesthetic judgments, proofing the mathematical CAD model, forming hard tooling, studying interference and space allocation, and testing functionality. The dominant application of layered manufacturing in recent years has been for rapid prototyping.

Examples of apparatus and methods for making three-dimensional models by depositing solidifiable modeling material are described in Crump U.S. Pat. No. 5,121,329, Batchelder, et al. U.S. Pat. No. 5,303,141, Crump U.S. Pat. No. 5,340,433, Batchelder, et al. U.S. Pat. No. 5,402,351, Crump et al. U.S. Pat. No. 5,503,785, Abrams et al. U.S. Pat. No. 5,587,913, Danforth, et al. U.S. Pat. No. 5,738,817, Batchelder, et al. U.S. Pat. No. 5,764,521 and Comb et al. U.S. Pat. No. 5,939,008, all of which are assigned to Stratasys, Inc., the assignee of the present invention. An extrusion head extrudes solidifiable material in a fluent strand (also termed a "bead" or "road") from an extrusion tip onto a base. An extrusion head may have several extrusion tips in order to extrude different materials. For example, an extrusion head may have a first extrusion tip that extrudes modeling material to build up a three-dimensional model, and a second extrusion tip that extrudes support material to provide temporary support during a model build cycle. A base comprises a modeling substrate which is removably affixed to a modeling platform. The extruded material is deposited by the extrusion tip layer-by-layer in areas defined from the CAD model, as the extrusion head and the base are moved relative to each other by mechanical means in three dimensions. It is important to maintain a proper distance between the extrusion tip and the base while the model is being built to ensure proper construction of the model. If the extrusion tip is too far away from the base, then the build material may be misplaced or deformed. Conversely, if the extrusion tip is too close to the base, then it may contact the model and cause damage to the model and possibly the extrusion tip or head itself. Furthermore, it is important to tightly control the distance between extrusion tips in a multiple tip system to ensure material layers are properly placed on the substrate or on top of one another.

Once finished, the model is removed from the substrate. A solidifiable material which adheres to the previous layer with an adequate bond upon solidification is used as the modeling material. Thermoplastic materials have been found particularly suitable for these deposition modeling techniques. Other additive process manufacturing techniques include depositing UV curable polymers as in Masters U.S. Pat. No. 5,46,569; jetting of droplets of material as in Helinski U.S. Pat. No. 5,50,515; extruding a settable plastic in vertical strips as in Valavaara U.S. Pat. No. 4,749,347; laser welding deposition as in Pratt U. S. Pat. No. 5,038,014; stacking and adhering planar elements as in DiMatteo U.S. Pat. No. 3,932,923; and applying shaped layers of paper as in Hull U.S. Pat. No. 5,82,559.

Several different types of rapid prototyping machines are commercially available. This commercial availability makes three-dimensional modeling very convenient for consumers because they can create three-dimensional models right at their own facility. However, the machines also require servicing from time to time such as when an extrusion tip may become unusable or unreliable due to a back-up or solidification of modeling material inside the tip. When the flow of modeling material through the extrusion tip is obstructed installation of a new tip is typically necessary. Consumer-replaceable components within the rapid prototyping field have become more available including replacement extrusion tips. While consumer-replaceable extrusion tips have made machine repairs more convenient, it also requires calibration of the tip once it has been replaced or re-installed. The calibration routine includes calibrating a Z-axis tip-to-substrate offset to ensure that the system knows the spatial relationship between the extrusion tip and the substrate prior to building a model. Furthermore, the calibration routine may include calibrating an X-axis and Y-axis tip-to-origin offset to ensure that the system knows the spatial relationship between the extrusion tip and an origin on the substrate. If multiple tips exist, the calibration routine also includes a Z-axis tip-to-tip offset, an X-axis tip-to-tip offset, and a Y-axis tip-to-tip offset. Without calibration, the position of the extrusion tips relative to the base and relative to each other may be incorrect, which may result in the inability of the modeling system to build accurate, error-free models.

Traditionally, calibration routines consisted of a manual or "eyeball" method performed by a trained consumer or technician. Previously, identifying any Z-axis tip-to-tip offset typically involved extruding layers of material and then manually measuring the thickness of the extruded material with a caliper. Similarly, identifying any X-axis or Y-axis tip-to-tip offset typically involved manually measuring the position of the extruded material along the X-Y axis. The tip-to-substrate offset is typically determined by etching a series of consecutive numbers into the substrate at increasing distances between the extrusion tip and the base and "eye-balling" the highest visible number etched into the substrate. The tip-to-origin offset was typically calibrated during assembly or as part of an extrusion head gantry position calibration. Unfortunately, calibration routines involving manual or "eyeball" methods can be unreliable and time-consuming. Additionally, because proper manual calibration requires operator judgment, it can be difficult for inexperienced users to identify the correct calibrated offsets.

Incorrect calibration of extrusion tips can result in the failure to form or build the three-dimensional model. Therefore, there exists a need for an automatic extrusion tip calibration routine that does not require operator intervention or judgment.

SUMMARY OF THE INVENTION

The present invention is a method for performing a calibration routine in a three-dimensional modeling machine that builds-up three-dimensional objects as directed by a controller that deposits modeling material from a deposition device onto a substrate mounted on a platform. The method comprises generating a material build profile, which represents a three-dimensional structure at a defined location. A relative position of the material build profile is then determined. An expected build profile is identified and then compared to the determined relative position of the material build profile to identify any difference therebetween from which an offset is determined. The modeling system then positions the deposition device based upon the offset.

BRIEF DESCRIPTION OF THE DRAWINGS

FIGS. 6A and 6B depict the lowering of the plunger to a sensing position.

FIGS. 7A and 7B depict the raising of the plunger to a stored position.

FIG. 13A is a top view of an alternative embodiment of a prefabricated fixture.

DETAILED DESCRIPTION

Figure 1:
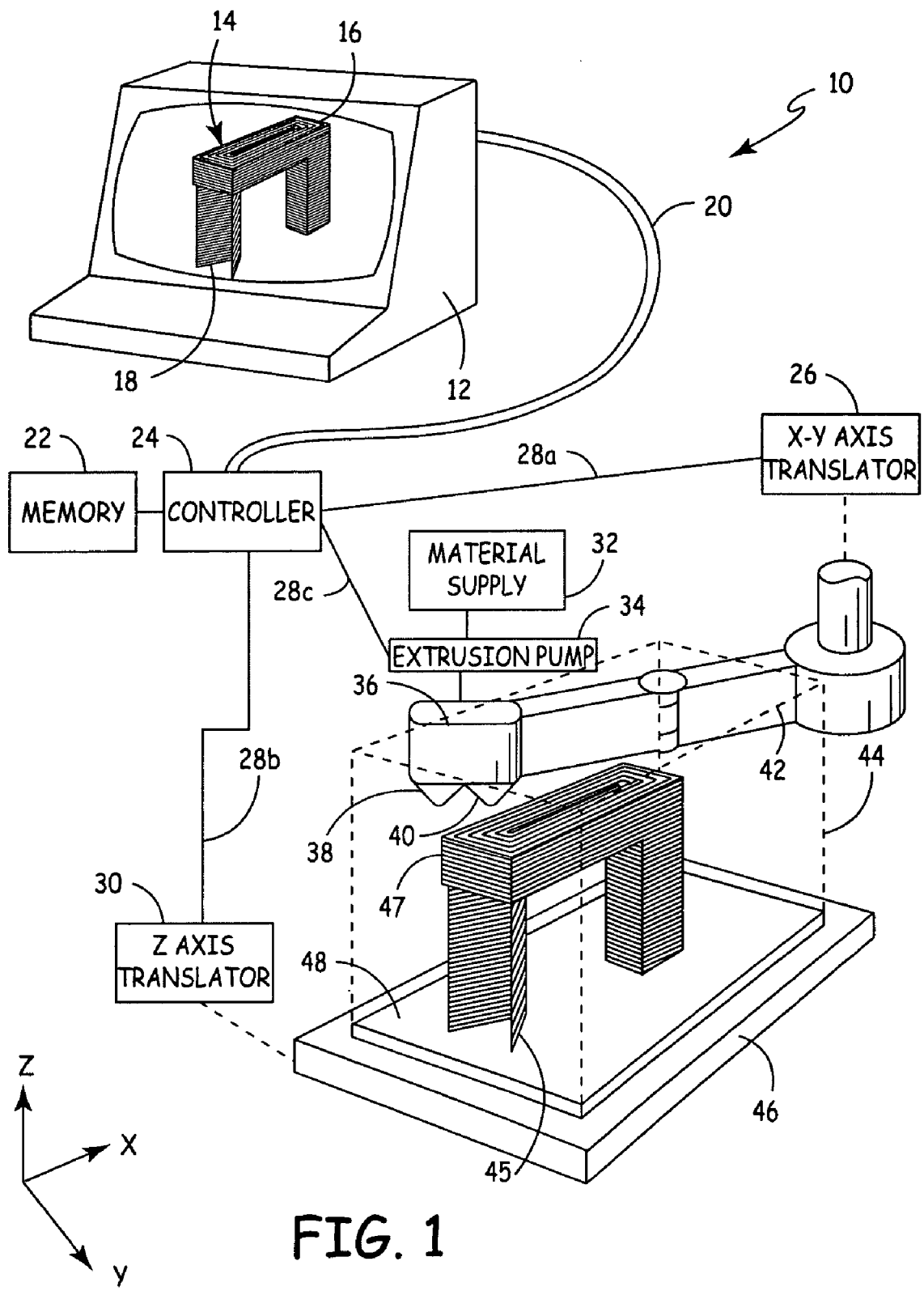
FIG. 1 is a schematic of a representative generic three-dimensional layered modeling system.

FIG. 1 shows a generic representation of a three-dimensional modeling system 10, of a type known in the art with which the present invention may be used. More specifically, the three-dimensional modeling system 10 illustrated in FIG. 1 is an extrusion-based layered modeling system. A computer aided design (CAD) program resident in processor 12 generates a file describing the geometry of part 14 to be created. A slicing program (shown as resident in processor 12, but which may alternatively be resident in a separate processor) algorithmically subdivides the file into modeling material volume elements 16 corresponding to shapes that can be extruded from a model material extrusion tip 38. Additional support material volume elements 18 are added as necessary to provide a mechanical support 45 to a model 47 of the part 14 during its construction.

Modeling system 10 utilizes a pair of dispensers 38 and 40, to dispense the different materials used to construct model 47 and support 45. In this embodiment, each dispenser includes its own discharge tip, such that modeling system 10 includes model material extrusion tip 38 which extrudes modeling material, and support material extrusion tip 40, which extrudes support material. Modeling material is dispensed by tip 38 to build the object or model 47 based on the modeling material volume elements 16, while support material is dispensed by tip 40 to form the underlying support 45 based on the support material volume elements 18. The support structure 45 is later removed after sufficient solidification of the modeling material that created the model 47.

Upon receiving three-dimensional shape data from processor 12 over line 20, controller 24 controls the extrusion of modeling material and support material in an XYZ-coordinate reference frame. Beads of modeling material and support material are extruded layer-by-layer in a build path that is a pattern defined by the modeling material volume elements 16 and support material volume elements 18. Controller 24 determines and maintains in associated memory 22 data representative of movements required to build the model 47 according to the build path for each layer. Based on this data, controller 24 sends control signals to X-Y axis translator 26, Z-axis translator 30, and extrusion pump 34 over output signal lines 28a, 28b and 28c, respectively, to create the particular layer according to the build path. X-Y axis translator 26 is an electromechanical device that moves robotic arm 42 according to the build path for the particular layer. Extrusion pump 34 synchronously provides modeling material and support material from material supply 32 to extrusion head 36 and ultimately deposited by model material extrusion tip 38 and support material extrusion tip 40, respectively.

The model 47 and support 45 are built on top of substrate 48. Substrate 48 is removably mounted on modeling platform 46 and is located in modeling envelope 44. Modeling platform 46 moves in a Z-direction under the control of Z-axis translator 30. The Z-axis as shown is oriented radially away from the earth's surface. In other implementations, however, it can be towards the ground or at some other chosen angle. Z-axis translator 30 incrementally lowers modeling platform 46 following deposition of a layer of modeling material or support material, to build up model 47 and support structure 45 layer-by-layer on substrate 48. After model 47 is created, it along with any corresponding support elements 45 are removed from modeling system 10 and from substrate 48.

Modeling system 10 builds precise and accurate models 47 by controlling the height and position of each layer that is built. Typically, modeling system 10 controls the rate that material is deposited from the deposition device to create each layer with a constant height. In this exemplary embodiment, the position of the tip depositing the material is important to ensure material is deposited and layers are built according to the build path in the proper locations. If the actual positions of the tips are not the same as the positions expected by controller 24, the layers of material will not be accurately extruded in the proper X-Y-Z positions.

The tip position is also very important in controlling the height of each build layer in the Z-direction. The bottom of the extrusion tip typically includes an "iron" that physically contacts and flattens out the bead of material making up the build path for that layer as it is deposited. If the tip extruding material is positioned too high above the surface that the material is being deposited upon, then the iron will not flatten out as much of the bead of material as expected resulting in the bead and layer height being greater than desired and not constant. Conversely, if the tip extruding material is too low, then the iron will flatten out too much of the bead of material resulting in a bead and layer height that is less than desired as well as potentially clogging the extrusion tip. Inconsistent bead heights within a build layer results in inconsistent layer heights which are propagated throughout the build cycle as the model 47 is being created. This results in errors and structural deficiencies in the model 47. It is important to the construction of accurate models 47 that the thickness and position of each layer be closely controlled.

Based upon the above discussion, it is apparent that in order to build accurate models, it is necessary to tightly control the X-Y position and the Z-axis height of a material bead. The present invention employs an automatic tip calibration capable of calibrating an extrusion tip in the X, Y, and Z directions in order to build precise and accurate models. For purposes of example and clarity of the invention, the following discussion will focus first on the calibration of one or more extrusion tips in the Z-direction, and then on the calibration in the X and Y directions.

Considering the Z-direction, the position of the tip extruding the material in relation to the surface upon which the material will be deposited must be controlled and maintained at a desired level in order to control the build layer thickness. This is accomplished by precise positioning of the extrusion tip with respect to the substrate 48 upon which the extrusion tip will initially deposit material. Once the extrusion tip is properly positioned in relation to the substrate 48, then precise control of movement of the platform 46, and hence the substrate 48, by the Z-axis translator 30 as well as the head 36 by the X-Y axis translator 26 is required. Upon completion of depositing one layer of the model 47 and support 45, the Z-axis translator 30 will lower the platform 46 a distance equal to the height of the next layer of material. This controlled movement will ensure that the extrusion tip remains positioned properly with respect to the surface upon which it will deposit material. The distance between the extrusion tip and the substrate 48 must therefore be determined along with any necessary offset to adjust the position of the platform 46 to attain the desired distance between the substrate 48 and the extrusion tip. The difference between the Z-axis position of the extrusion tip and the substrate represents a Z-axis tip-to-substrate offset for that particular extrusion tip.

Modeling system 10 may include multiple extrusion tips as illustrated in FIG. 1. Typically, modeling system 10 includes only one extrusion position and toggles the multiple extrusion tips between a higher stored, or non-extruding position, and the lower extrusion position as explained in U.S. Pat. No. 5,503,785. As with a single tip, each of the multiple tips also must be positioned an equal distance from the surface upon which they will deposit their respective materials when they are in the extrusion position. However, until properly calibrated, the relative Z-axis positions of the tips may vary when each of the different tips are in the extrusion position. This difference should be accounted for and the position of the platform 46 adjusted to position each of the multiple tips an equal distance from the surface upon which they will deposit their respective material. The difference between the Z-axis position of the tips represents a Z-axis tip-to-tip offset value. The tip-to-tip offset value represents the adjustment necessary to the position or height of the platform 46 in order to position the tips the same distance away from the surface upon which they will deposit material.

Figure 2:
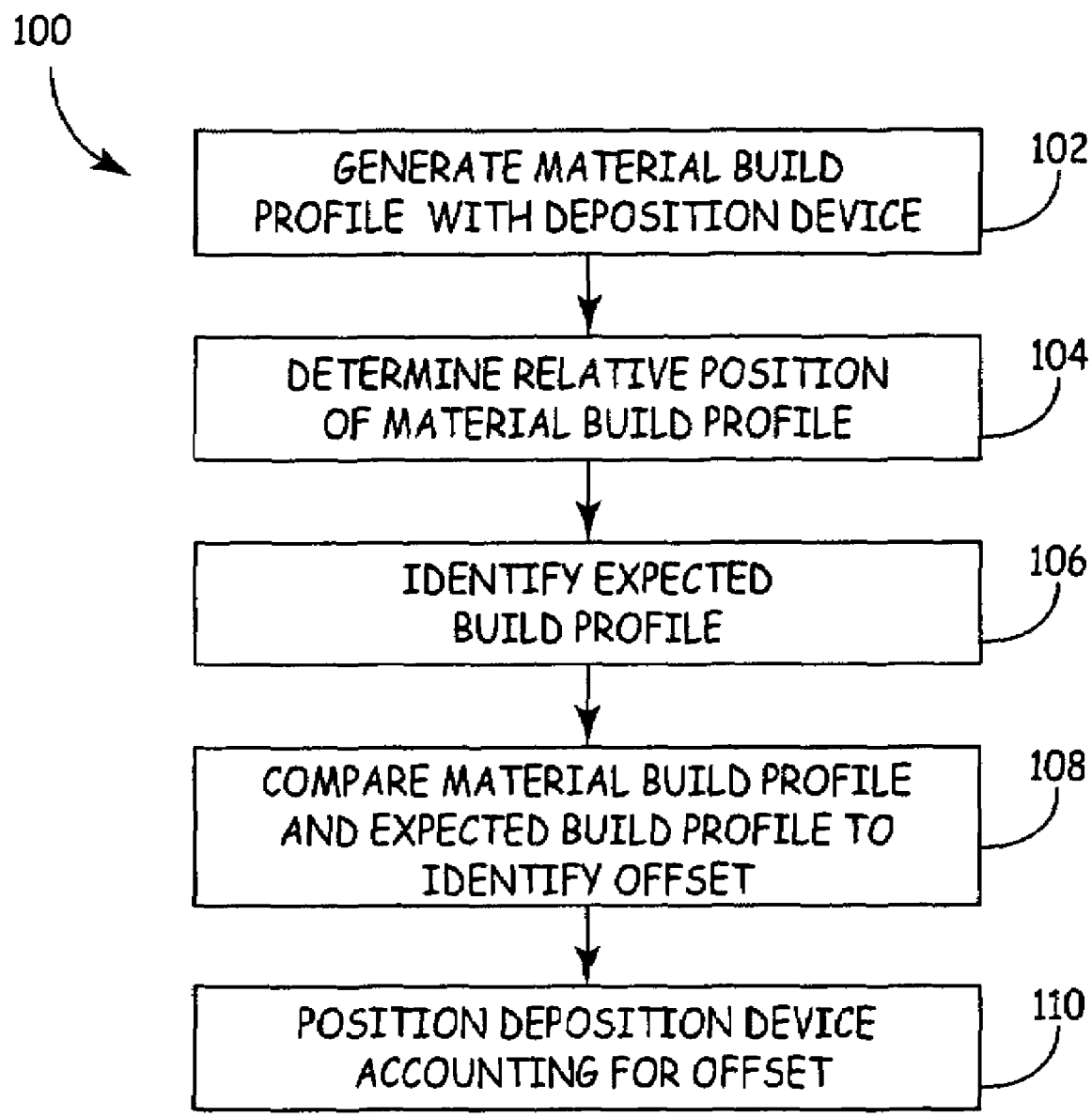
FIG. 2 is a process flow diagram illustrating the steps executed in performing a calibration routine according to the present invention.

The present invention relies upon the ability of the modeling system 10 to create constant height bead layers and to properly position the platform 46 to calibrate the position of the extrusion tips in relation to a reference point, such as the substrate, and any other extrusion tips. FIG. 2 is a flowchart of a tip calibration method 100 according to the present invention. For purposes of example, the calibration method 100 will now be described with reference to a Z-axis tip calibration. However, it should be understood that an X-axis and a Y-axis tip calibration may also be performed by application of calibration method 100, as will be described in more detail later.

The method 100 begins by generating a material build profile in step 102. The material build profile may either be generated by the modeling system 10 with the particular extrusion tip that is being calibrated or by placing a prefabricated structure on the platform 46. In this example, the material build profile is a structure having a defined shape and size created from the material deposited by the extrusion tip. The defined shape and size of the material build profile results in defined lengths, widths, and heights for the structure that is built at a defined and precise location.

Once the material build profile is created, its relative position which may represent a dimension or a specific location is determined in step 104. The relative position of the material build profile in this example is determined by measuring the height of the structure relative to a reference point, such as the substrate 48, at specific defined locations.

An expected build profile is identified in step 106. The expected build profile represents the dimension or location that should be obtained for the relative position of the material build profile if the tip is properly calibrated. In this example, the expected build profile may be identified by relying on the ability of the modeling system 10 to generate layers of material with a constant height.

The expected build profile for a Z-axis tip-to-substrate calibration may be either provided as an input to or calculated by the controller 24. For instance, an expected build profile (such as a height) may be inputted to the controller 24 from either the processor 12 or memory 22. The controller 24 may also calculate the expected build profile by multiplying the constant height value for each layer generated by the modeling system 10 by the number of layers that would be required to create the material build profile according to its defined shape and size.

Alternatively, the expected build profile for a tip-to-tip calibration may be identified by determining the relative position of a second structure. The second structure may be either prefabricated or created by a second deposition device or, in this case, a second extrusion tip. In the case of a tip-to-tip calibration, the expected build profile could be identified by measuring a relative position, such as a height, of the second structure having the same defined shape and size and created according to the same build path as the original material build profile, but at a different defined location. The second structure would also be created by the other extrusion tip that is the subject of the tip-to-tip calibration.

After the expected build profile is identified, then the material build profile is compared to the expected build profile in step 108 to identify any offset that may exist. The offset may be identified as either the difference between or determined from the material build profile and the expected build profile when those values are compared. For instance, if the extrusion tip is too low or close to the substrate 48 when the initial layer is deposited, the extrusion tip will iron the material being deposited such that the height of the material build profile will be less than the constant height value of the layer of material when the modeling system 10 is operating and calibrated properly. The offset represents the adjustment necessary to properly position the extrusion tip that created the material build profile with respect to the substrate 48 carried by the platform 46. This adjustment of the extrusion tip position taking into account the offset is performed in step 110. In this instance where the extrusion tip is too low or close to the substrate 48, the modeling system 10 would lower the platform 46 an amount equal to or derived from the offset to properly position the extrusion tip with respect to the substrate 48. The modeling system 10 would also record or store the offset value in memory 22 to properly position the extrusion tip on subsequent builds.

Figure 3:
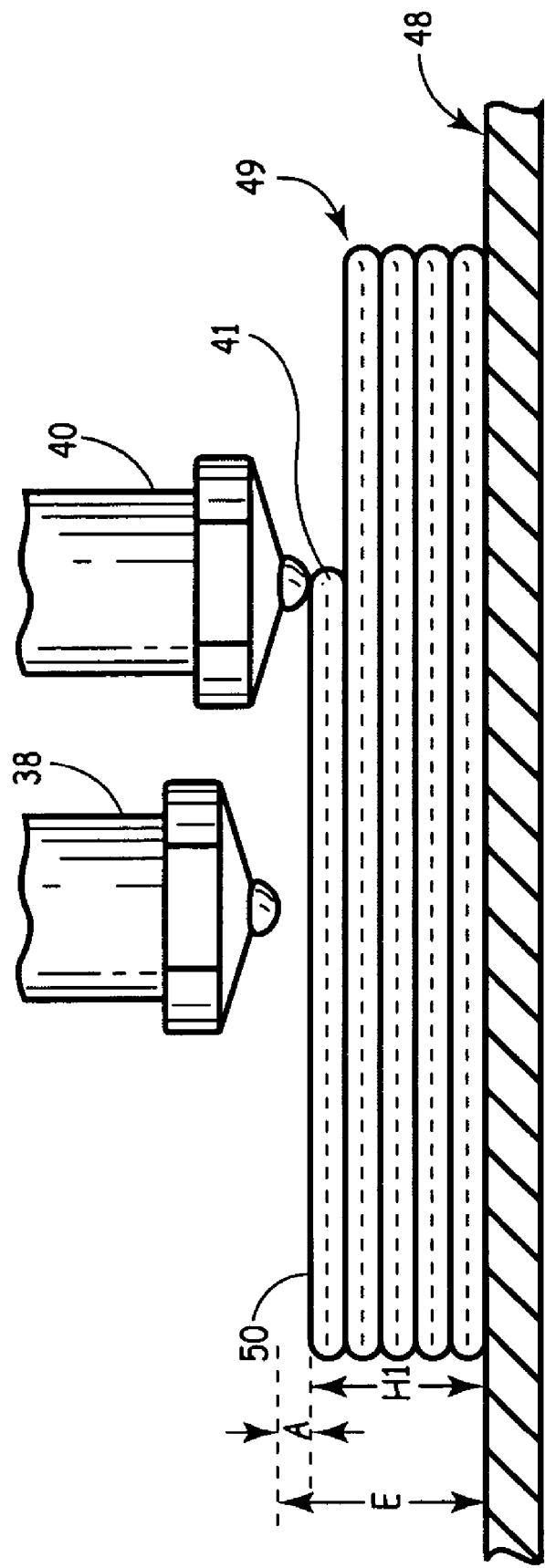
FIG. 3 is a side view of a support material extrusion tip of an extrusion-based layered modeling system of the present invention extruding a support pad of material.

FIG. 3 is a side view illustrating the support material extrusion tip 40 depositing, in this example, support material 41 on top of substrate 48. Support material 41 is shown with a broken line through its center to distinguish the support material 41 from the build material 43 in FIG. 4. The modeling system 10 deposits support material 41 with support material extrusion tip 40 according to a defined build path to generate the material build profile of step 102 in method 100. The material build profile illustrated in FIG. 3 is referred to as a pad 49. The pad 49 is in a geometric shape of a rectangle as shown in FIG. 5. As shown in FIG. 3, the support material extrusion tip 40 is depositing a top or final layer 50 of support material 41 to construct the pad 49.

Upon completing the construction of pad 49, or the material build profile, the relative position of the pad 49, or step 104, is determined in the X, Y, or Z axis to calibrate along that respective axis. In this example, the Z-axis is being calibrated and so the height of the pad 49, which represents the material build profile, is determined to be a height H1.

The height of the expected build profile is identified next in step 106. The expected build profile is identified as height E in FIG. 3. In this instance, height E is determined by calculating the product of the constant layer height value that the modeling system 10 deposits material and the number of layers required to build the pad 49, which in this case is five layers. The constant layer height value of the modeling system 10 equals the theoretical height of each layer according to the slicing program.

As illustrated in FIG. 3, in this example the height H1 is less than the height E by the distance A. This indicates that the support extrusion tip 40 is too low or close to the substrate 48 and as a result, the support material extrusion tip 40 plowed through the support material 41 while creating the pad 49 and lowered or reduced the height of the build layers comprising the pad 49. The distance A is used to determine or derive the offset necessary to properly position the tip 40 with respect to the substrate 48, or the Z-axis tip-to-substrate offset for the tip 40. Once the tip 40 has been properly positioned with respect to the substrate 48 by accounting for the offset corresponding to the distance A, tip 40 has been calibrated with respect to substrate 48, or the Z-axis tip-to-substrate calibration has been completed. In this embodiment, the calibration routine 100 determines the Z-axis tip-to-substrate offset within a tolerance of about 0.0005 inches.

Upon completing the Z-axis tip-to-substrate calibration, the modeling system 10 is able to build accurate models 47 or supports 45 with the tip 40. If the modeling system 10 includes only one extrusion tip, then the Z-axis calibration of the extrusion tip is completed. However, if the modeling system 10 includes more than one extrusion tip, then the remaining extrusion tips also require calibration.

When the modeling system 10 includes multiple extrusion tips, it will typically toggle the extrusion tip that will deposit the desired material for that build path into the extrusion position from its stored or non-extruding position. The extrusion position is generally lower than the stored or non-extruding position. This difference in tip position between the extruding position and stored or non-extrusion position is illustrated by comparing the relative positions of tips 38 and 40 in FIGS. 3 and 4. In FIG. 3, tip 40 has been toggled by controller 24 into the extrusion position which is lower than the stored or non-extrusion position of tip 38. Conversely, in FIG. 4, controller 24 has toggled tip 38 into the extrusion position which is lower than the stored or non-extruding position of the tip 40. By positioning the tip which is not depositing material in a higher stored position, the modeling system 10 ensures there is adequate clearance to deposit material out of the other tip and avoid the non-depositing tip from contacting or plowing into the deposited material.

In a multiple tip modeling system 10, the tip that will deposit material first is generally used to perform the Z-axis tip-to-substrate calibration. This will ensure that the initial layer of deposited material will begin correctly. Typically, the modeling system 10 will deposit a base of support material 41 atop substrate 48 and then build model 47 on top of the base. Creating a base of support material 41 will facilitate separation of the model 47 from the substrate 48 without damage to the model 47. While each tip in a multiple tip modeling system 10 could be calibrated to the substrate, it is also preferable to calibrate one tip to another with a Z-axis tip-to-tip calibration.

Figure 4:
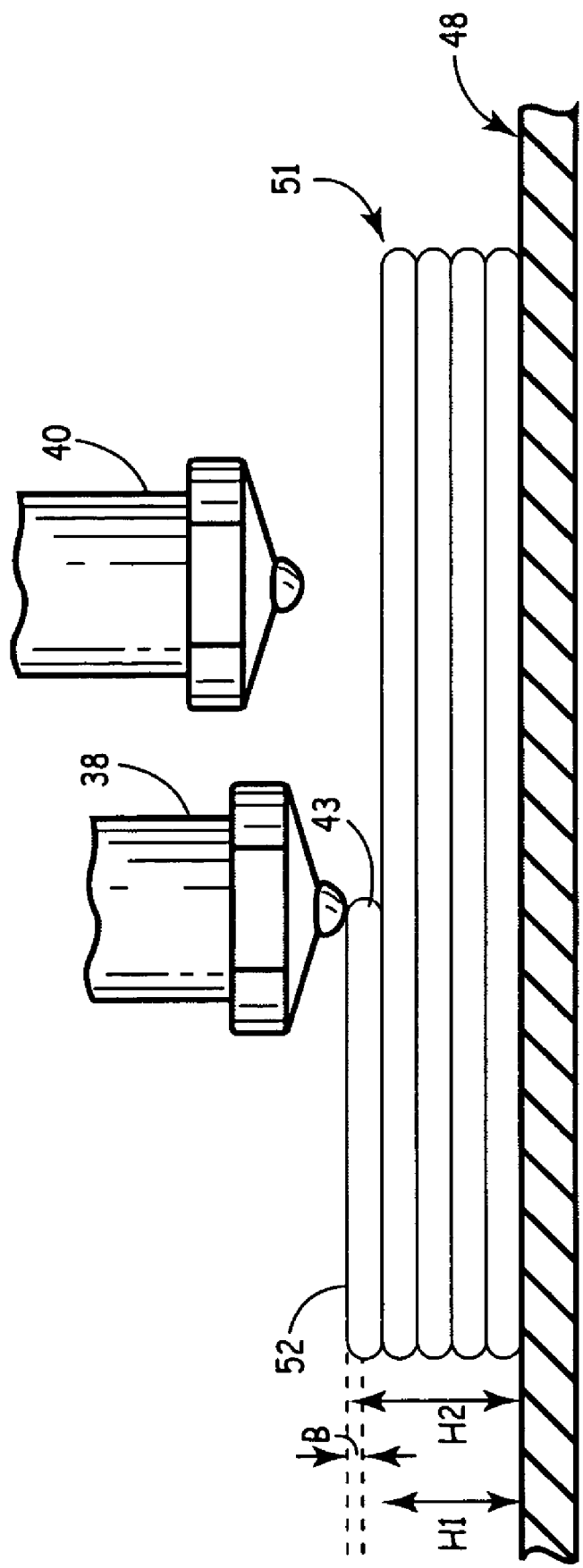
FIG. 4 is a side view of a model material extrusion tip of the extrusion-based layered modeling system of the present invention extruding a model pad of material.
Figure 5:
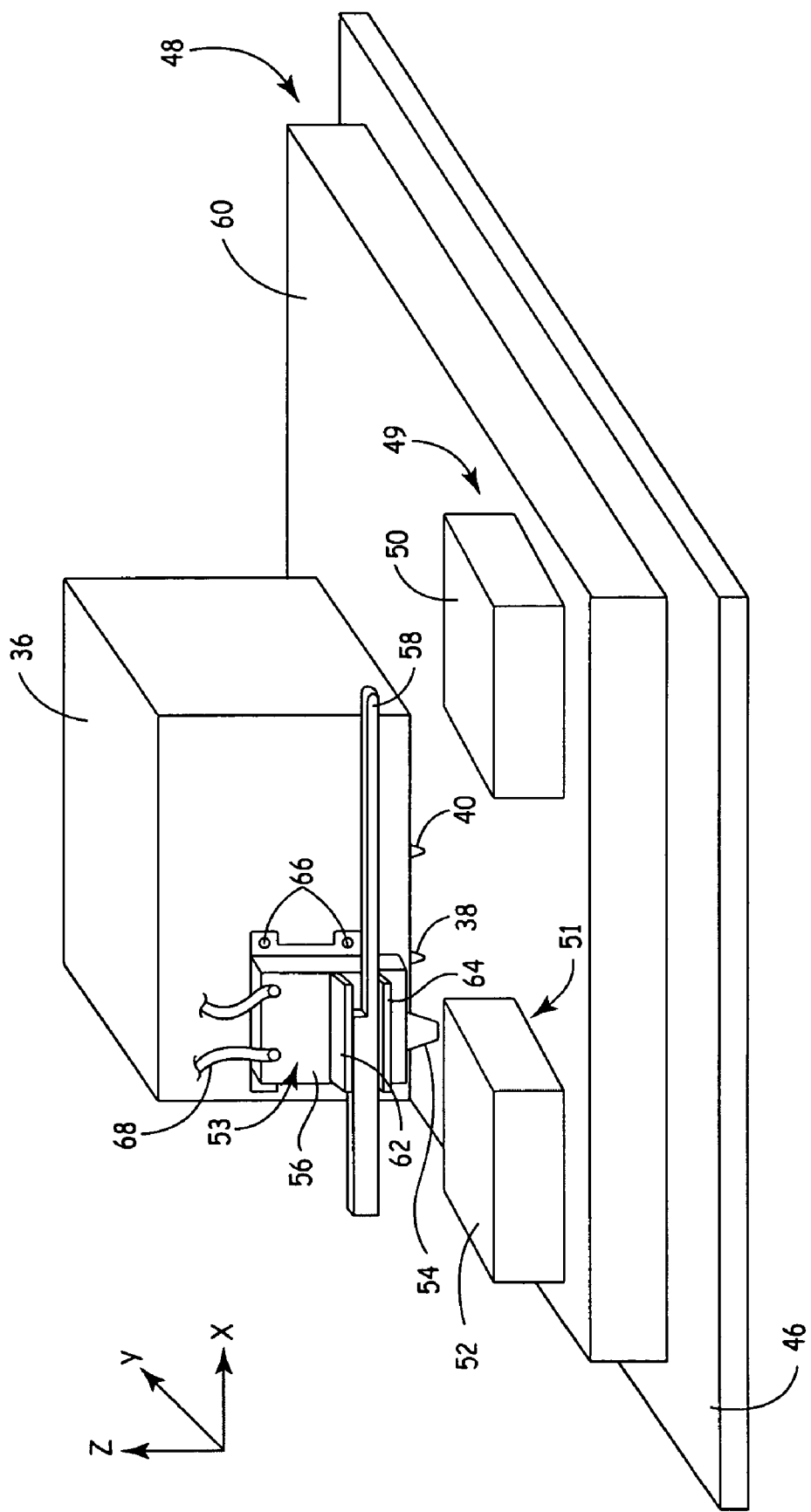
FIG. 5 is a perspective view of a preferred embodiment of a sensor assembly of the present invention with a plunger in the lowered position, mounted to an extrusion head of the extrusion-based layered modeling system and positioned over the model pad and the support pad.

FIG. 4 illustrates the method 100 of the present invention for a Z-axis tip-to-tip calibration. As shown in FIG. 4, material extrusion tip 38 has been toggled into the extrusion position to deposit build material 43 while support extrusion tip 40 has been toggled to a stored or non-extruding position. Material extrusion tip 38 deposits build material 43 in the defined shape and size at a precise location to generate the material build profile of step 102. Again, in this example, the modeling system 10 generates a pad 51 similar to the pad 49, except that pad 51 is constructed with build material 43 rather than support material 41 like the pad 49. As shown in FIG. 4, the tip 38 is depositing a last layer or top layer 52 of build material 43 to create pad 51, or the material build profile for this calibration.

Once the construction of the pad 51 is completed, then the relative position of the pad 51 is determined in step 104. Again, in this example, the height of pad 51 is determined and is equal to a height H2 as shown in FIG. 4. The expected build profile is identified next in step 106. Since this is a Z-axis tip-to-tip calibration, the expected build profile is identified by determining the relative position of a second structure of similar shape and size generated by the other tip, which in this case is tip 40. As illustrated in FIG. 5, the pads 49 and 51 were built with the same defined size and shape according to the same build path other than being created at different locations on the substrate 48.

In this example, the expected build profile is identified by determining the height, or relative position, of the pad 49. Here, the height, or relative position, of the pad 49 was already determined in the Z-axis tip-to-tip substrate calibration. The expected build profile for the tip-to-tip calibration is therefore identified as the height H1, which has already been determined. As demonstrated in this example, step 106 or the identification of the expected build profile can be determined or calculated at some earlier time other than after step 104 as set forth in the method 100 without departing from the spirit or scope of the invention.

As illustrated in FIG. 4, the height H2 of the material build profile when compared to the height H1 of the expected build profile is greater by a distance B. The distance B represents the relative difference in the position of tip 38 compared to the tip 40 when each are placed into the extrusion position of the modeling system 10. Given that the height H2 is greater than the height H1, tip 38 is higher or farther away from the surface upon which it will deposit material than tip 40 when each are in the extrusion position. As a result, the distance B represents the offset between tips 38 and 40 or the Z-axis tip-to-tip offset.

The modeling system 10 will then adjust the position of the platform 46 to account for the offset B when the controller 24 toggles between tips 38 and 40. In this example, the modeling system 10 would move the platform and hence the surface upon which the extrusion tip 38 would deposit material up or closer to the extrusion tip 38 by an amount determined or derived from distance B. The offset determined or derived from the distance B is then stored in memory 22 for later reference and use to create subsequent models. In an embodiment of the invention, the calibration routine 100 determines the Z-axis tip-to-tip offset with a tolerance of about 0.0005 inches.

The calibration routine 100 is ran by the controller 24 automatically, without requiring assistance by the operator. The calibration routine 100 could be programmed to automatically calibrate its extrusion tips during initialization or start up, or upon sensing or determining that an extrusion tip or substrate was replaced either with or without operator input. The calibration routine 100 could also be used to initially calibrate the system, adjust existing offsets to calibrate the system or confirm calibration of the modeling system 10.

FIG. 5 is a perspective view of a sensor assembly 53 of the present invention, mounted to extrusion head 36 of the modeling system 10. Sensor assembly 53 is a sensor assembly capable of sensing surfaces to determine the positions of those surfaces and hence to determine the dimensions of the material build profile or expected build profile such as the pads 49 and 51 in steps 104 and 106 of method 100. It should be understood that the teaching of this invention is not limited for use only with an extrusion-based layered manufacturing system of the type shown and described in FIG. 1. That is, the invention may also be used in any "additive" or "subtractive" three-dimensional modeling system.

Portions of the modeling system 10 are shown in FIG. 5 to highlight the sensor assembly 53. Those portions of the modeling system 10 include the extrusion head 36 which is positioned over the substrate 48, that is supported by the platform 46. Extrusion head 36 moves in an X-Y plane and platform 46 moves along a Z-axis, as described above with respect to FIG. 1. Extrusion head 36 terminates in model material extrusion tip 38 and support material extrusion tip 40.

Sensor assembly 53 includes a plunger 54, a housing 56, and an actuator 58. Sensor assembly 53 is mounted to a backside of the extrusion head 36 by a set of four connectors 66. The actuator 58, which is generally in the shape of a bar, is bounded between an upper guide 62 and a lower guide 64 of housing 56. Actuator 58 slides horizontally from side-to-side between the upper guide 62 and the lower guide 64 in response to an application of a horizontal force. The side-to-side motion of actuator 58 alternately lowers and raises plunger 54. In its raised position, plunger 54 is located above both model material extrusion tip 38 and support material extrusion tip 40 in the Z-direction. Conversely, in its lowered, sensing position as shown in FIG. 5, plunger 54 is located below both model material extrusion tip 38 and support material extrusion tip 40 in the Z-direction.

To determine the relative positions, or in this case the height of the pads 51 or 49, the plunger 54 is lowered into its sensing position and the extrusion head 36 positions itself over the model pad 51, such that the X,Y coordinates of the plunger 54 are within the X,Y coordinates that define the top surface 52 of the model pad 51. After plunger 54 is positioned at a preselected X,Y coordinate above model pad 51, platform 46 moves along the Z-axis at a steady rate in a direction toward plunger 54 until it pushes the top surface 52 of the model pad 51 into the plunger 54. At that point, sensor assembly 53 sends a detection signal to controller 24 via a signal line 68. Controller 24 records the Z-axis position of the platform 46 corresponding to the instant in time at which the signal change was detected. By recording the Z-axis position of the platform 46 at which the signal change is detected, the controller 24 is able to determine the Z-axis position of platform 46 at which point the top surface 52 of the model pad 51 contacted the plunger 54. This same process may be repeated at other preselected X,Y coordinates lying within the boundary defining the top surface 52 of the model pad 51 in order to obtain a plurality of Z-axis positions that can be averaged to identify a more accurate Z-axis value corresponding to the top surface 52.

The extrusion head 36 will also position itself over support pad 49 such that the X,Y coordinates of plunger 54 are within the X,Y coordinates that define the top surface 50 of the support pad 49. Controller 24 will then determine one or more Z-axis positions of the platform 46 corresponding to the points at which the top surface 50 of the support pad 49 contacts the plunger 54 in the same manner as described above with respect to the model pad 51.

Extrusion head 36 also positions itself over the substrate 48 such that the X,Y coordinates of the plunger 54 are within the X,Y coordinates that define the top surface 60 of the substrate 48. Then, controller 24 will determine one or more Z-axis positions of the substrate 48 corresponding to the points at which the top surface 60 of the substrate 48 contacts the plunger 54 in the same manner as described above with respect to the model pad 51 and the support pad 49. Once the Z-axis position of substrate 48 is identified, it can be used as a baseline, reference, or origin from which to determine the height of the pads 49 and 51 by the relative difference in the Z-axis positions of the tops 50 and 52 of the pads 49 and 51, respectively, and the substrate 48. However, the Z-axis positions of the substrate 48 are preferably determined prior to building any structures on the substrate 48. Otherwise, care must be taken regarding the X,Y position used to sense the top surface 60 of the substrate 48 to ensure there is sufficient clearance of any structure for the sensor assembly 53 carried by the extrusion head 36.

The method used by modeling system 10 to automatically move plunger 54 into its lowered, sensing position is depicted in FIGS. 6A and 6B, which represent a close-up view of extrusion head 36 from FIG. 5. To lower the plunger 54, the X-Y axis translator 26 moves the extrusion head 36 in the X-plane so as to drive the actuator 58 against a first stationary block 78 located outside of the modeling envelope 44. In the embodiment shown in FIG. 6B, the force of the block 78 against the actuator 58 pushes the actuator 58 to its leftward position and lowers the plunger 54 into its sensing position.

The method used to move the plunger 54 into its raised, stored position after the sensor assembly 53 has finished sensing Z-axis positions corresponding to the model pad 51, the support pad 49, and the substrate 48 is depicted in FIGS. 7A and 7B. To raise the plunger 54, the X-Y axis translator 26 moves the extrusion head 36 in the X-plane so as to drive the actuator 58 against a second stationary block 82 located outside of the modeling envelope 44 in a direction opposite that of the stationary block 78. In the embodiment shown in FIG. 7B, the force of the block 82 against the actuator 58 pushes the actuator 58 to its rightward position, thereby raising the plunger 54 to its stored position.

Figure 8A:
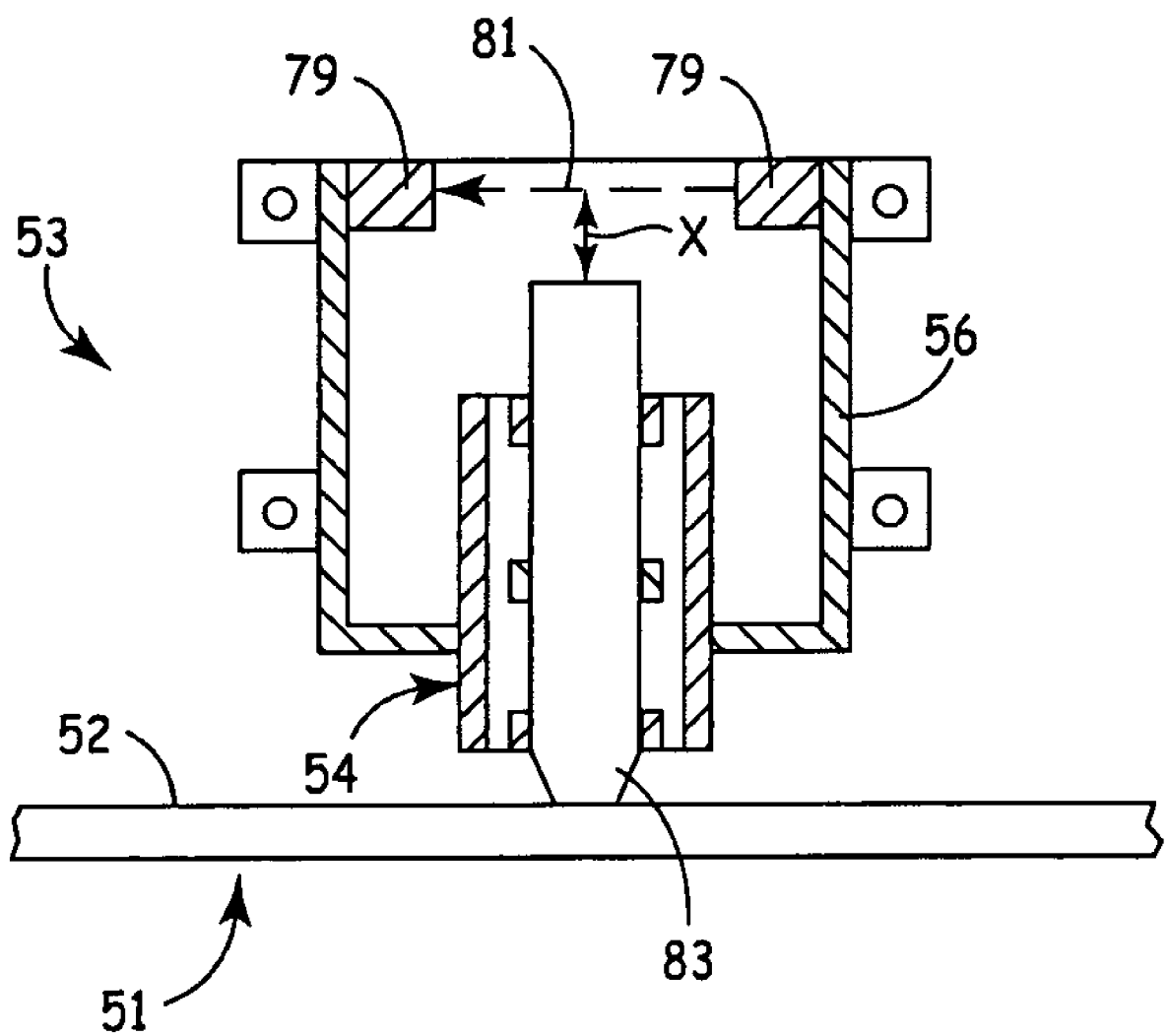
FIG. 8A is a cross-sectional view of the sensor assembly of FIG. 5, with the plunger in contact with the model pad.
Figure 8B:
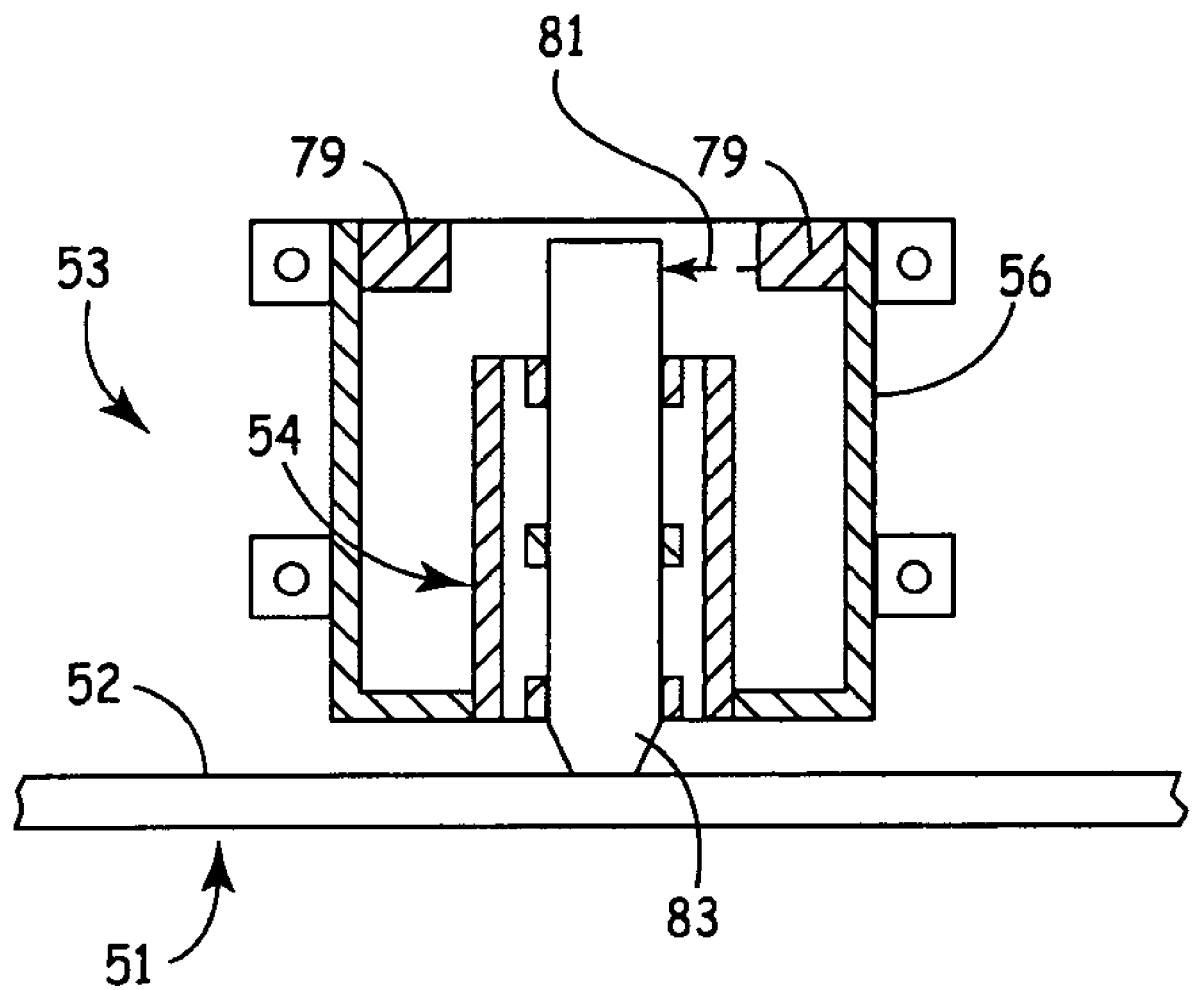
FIG. 8B is a cross-sectional view of the sensor assembly of FIG. 5, with the plunger occluding an optical sensor.

FIGS. 8A and 8B show details of an embodiment of the plunger 54 attached to the sensor assembly 53 as it senses the top surface 52 of the model pad 51. In FIG. 8A, the platform 46 has moved in a Z-axis direction toward the sensor assembly 53 such that the model pad 51 and the plunger 54 have just made contact. As shown in FIG. 8A, a sensor 79 emits a beam of light 81 across the inside of sensor assembly 53. The top of plunger 54 is situated a predetermined distance X below the beam of light 81. In an embodiment of the sensor assembly 53, the predetermined distance X is about 0.1875 inches.

In FIG. 8B, platform 46 has moved in the Z-axis direction closer toward the sensor assembly 53, such that the force of the model pad 51 on the plunger 54 has moved the plunger 54 upward by the predetermined distance X into the beam of light 81. As a result, there is a change in the signal provided by the sensor 79, and controller 24 records the Z-axis position of the platform 46 corresponding to the instant in time at which the signal change was detected. Sensor assembly 53 senses the top surface 50 of the support pad 49 and the top surface 60 of the substrate 48 in a similar manner.

As depicted in FIGS. 8A and 8B, the plunger 54 terminates in a flat downward-facing tip 83. Tip 83 should have a contact area large enough that the force of contact of the tip 83 against the substrate 48, the model pad 51, or the support pad 49 does not exceed an elastic yield limit of the substrate, modeling material, or support material. As shown in FIGS. 8A and 8B, the sensor 79 is an optical sensor. Suitable optical sensors are available from OPTEK Technologies, for example, model OPB380T51. The electrical output signal from sensor 79 changes state when the light beam of sensor 79 is occluded by plunger 54.

Although the foregoing discussion has been directed toward tip calibration in the Z-direction, tip calibration in the X-direction and Y-direction may also be performed by application of the present invention. For example, sensor assembly 53 may be rotated so that plunger 54 senses in the X-direction and the Y-direction. In that case, sensor assembly 53 is raised and lowered as described with respect to FIGS. 6A, 6B, 7A, and 7B. However, instead of driving plunger 54 into pad 49 or 51 by moving platform 46, modeling system 10 would drive plunger 54 into a side of one of the pads 49 or 51. For example, modeling system 10 would move extrusion head 36 in the X-plane until plunger 54 contacts a side of the pad that is substantially parallel with the Y-axis, thereby pushing plunger 54 into sensor assembly 53 until it moves the predetermined distance X as shown in FIG. 8B. The same routine applies for sensing a side of the pad that is parallel with the X-axis, although extrusion head 36 will instead move in the Y-plane.

Calibrating extrusion tip offsets in the X and Y directions in addition to the Z-direction is necessary to construct accurate, error-free models. If the precise location of and relation between extrusion tips is not tightly controlled, the tips will extrude beads of material that are misplaced, thereby causing inaccuracies in the model. In order to control the position of extruded layers of material, the position of the tip extruding the material in relation to the surface upon which the material will be deposited must be controlled and maintained. In particular, controller 24 will direct X-Y axis translator 26 to position tip 38 or 40 at specific X,Y locations above substrate 48 corresponding to a defined build path. Thus, it is important for controller 24 to know the precise position and relation between the tips. Calibrating the tip positions along the X and Y axes ensures that layers of material are extruded in a precise, known position.

Similar to the Z-axis tip calibration described above, the X-Y axis tip calibration may also have two components. The first component of the X-Y axis tip calibration is an X-axis tip-to-origin offset and a Y-axis tip-to-origin offset. The tip-to-origin offsets represent a deviation between an actual tip position and an expected tip position relative to a predetermined origin, which is generally located on the substrate. If an offset exists, the controller 24 will move the relative position of the extrusion tip based upon the offset value to position the tip in relation to the substrate 48 at the location expected by modeling system 10. Thus, calibrating the tip-to-origin offset ensures that the actual X and Y position of the extrusion tip is consistent with the position expected by modeling system 10.

The second component of the X-Y axis tip calibration applies only in modeling systems that utilize multiple tips, such as modeling system 10 shown in FIG. 1. Once again, in a modeling system that includes multiple extrusion tips, it will typically toggle the extrusion tips between an extrusion position and a stored, non-extruding position. As in the Z-direction, modeling systems with multiple extrusion tips also require calibration and a determination of any necessary offset between the tips when each tip is in the extruding position for the X-direction as well as the Y-direction. As a result, the X and Y tip offsets reposition the extrusion tips as necessary to ensure they extrude material at the specific X, Y locations called for by the build path. Calibrating an X-axis tip-to-tip offset and a Y-axis tip-to-tip offset is necessary to extrude layers of material in expected locations and to build accurate, error-free models. The tip-to-tip offset for the X and Y directions can be performed relative to a first tip that is calibrated with a tip-to-origin calibration as was discussed in relation to the Z direction with FIG. 4. Alternatively, each tip of a multiple tip modeling system could be calibrated individually with a tip-to-origin calibration.

Figure 9:
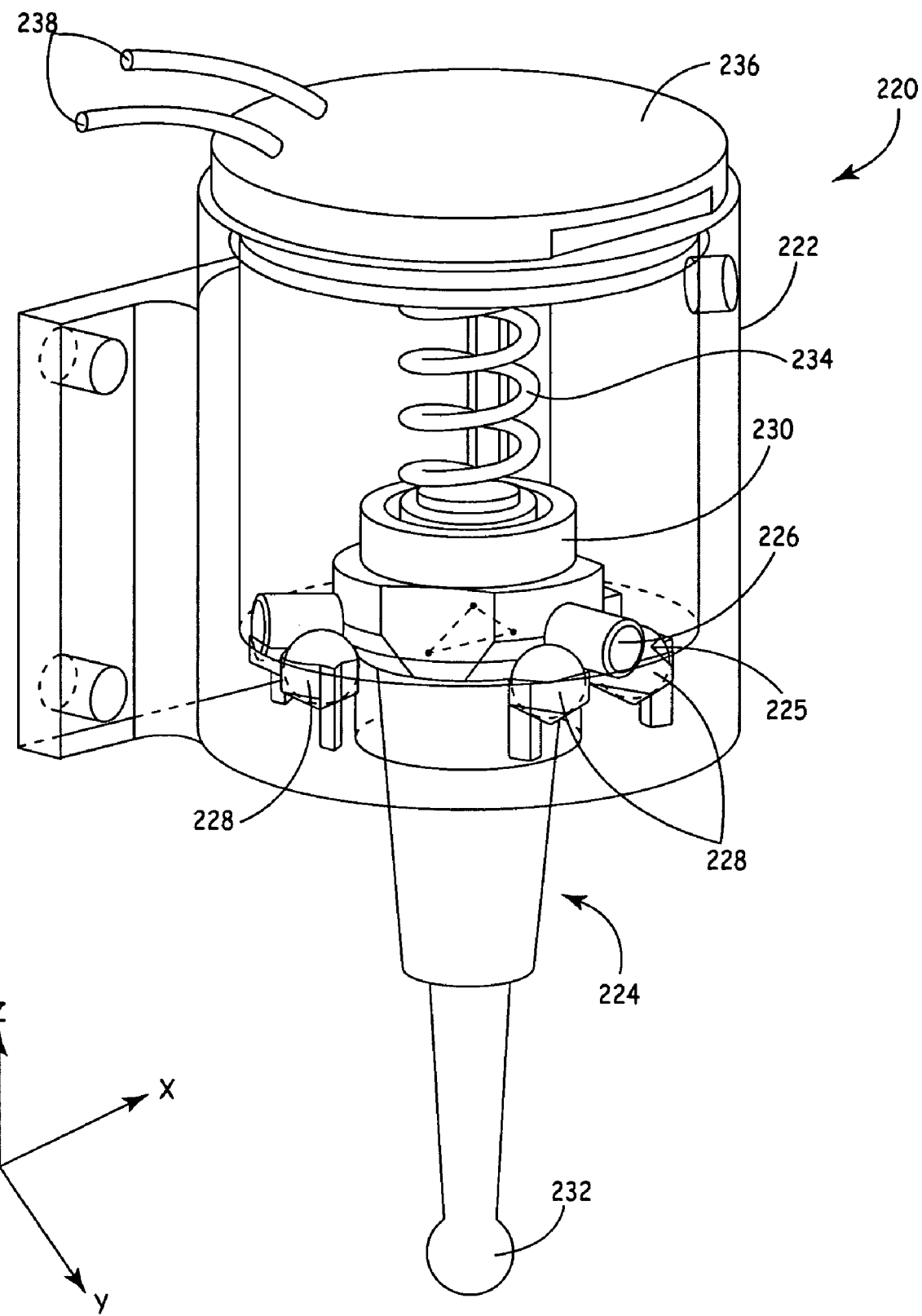
FIG. 9 is a perspective view of an alternative embodiment of the sensor assembly of the present invention.

A multi-axis sensor assembly 220 shown in FIG. 9 may be alternatively used instead of the sensor assembly 53 to determine the extrusion tip offsets in the X and Y directions, as well as in the Z-direction. Multi-axis sensor assembly 220 includes a housing 222, a plunger 224, and a sensor 225. Plunger 224 includes an upper end 230 located within housing 222, and a tip 232 hanging below housing 222. The sensor 225 includes a plurality of rod members 226 and a plurality of electrical contacts 228. Rod members 226, which are coupled to plunger 224, are positionable between electrical contacts 228 as shown in FIG. 9. Multi-axis sensor assembly 220 further includes spring 234, which is coupled on one end to top 236 of housing 222, and on another end to upper end 230 of plunger 224. Spring 234 allows plunger 224 to move upward along the Z-axis, and provides a means for returning plunger 224 to its lowered position with rod members 226 in contact with electrical contacts 228. In addition to sensing surfaces in the Z-direction, multi-axis sensor assembly 220 has the capability of sensing surfaces in the X and Y directions by applying a force to an outer surface of tip 232. In the preferred embodiment, multi-axis sensor assembly 220 generally consists of three rod members 226 and three pairs of electrical contacts 228, as shown in FIG. 9.

When every rod member 226 in the plurality of rod members 226 of the multi-axis sensor assembly 220 is in contact with its respective pair of electrical contacts 228, an electrical circuit is completed. However, as soon as one or more rod members 226 break their connection with the pair of electrical contacts 228, a signal is sent over signal lines 238 to controller 24. For instance, when plunger 224 is pushed against a surface in the Z direction, it moves upward into housing 222, thereby breaking the connection between rod members 226 and electrical contacts 228. Similarly, when plunger 224 is pushed against a surface in the X or Y direction, it tilts with respect to housing 222, thereby causing one or more rod members 226 to break the connection with its respective pair of electrical contacts 228. The multi-axis sensor assembly 220 may therefore be used to sense not only a top surface of a material pad, but also the sides of the material pad as well.

Multi-axis sensor assembly 220 may be coupled to extrusion head 36 and actuated into position as previously described with regard to sensor assembly 53 illustrated in FIGS. 6A, 6B, 7A, and 7B. Alternatively, multi-axis sensor assembly 220 may be temporarily attached to extrusion head 36 during the calibration routine, and removed once the calibration is complete.

Figure 10:
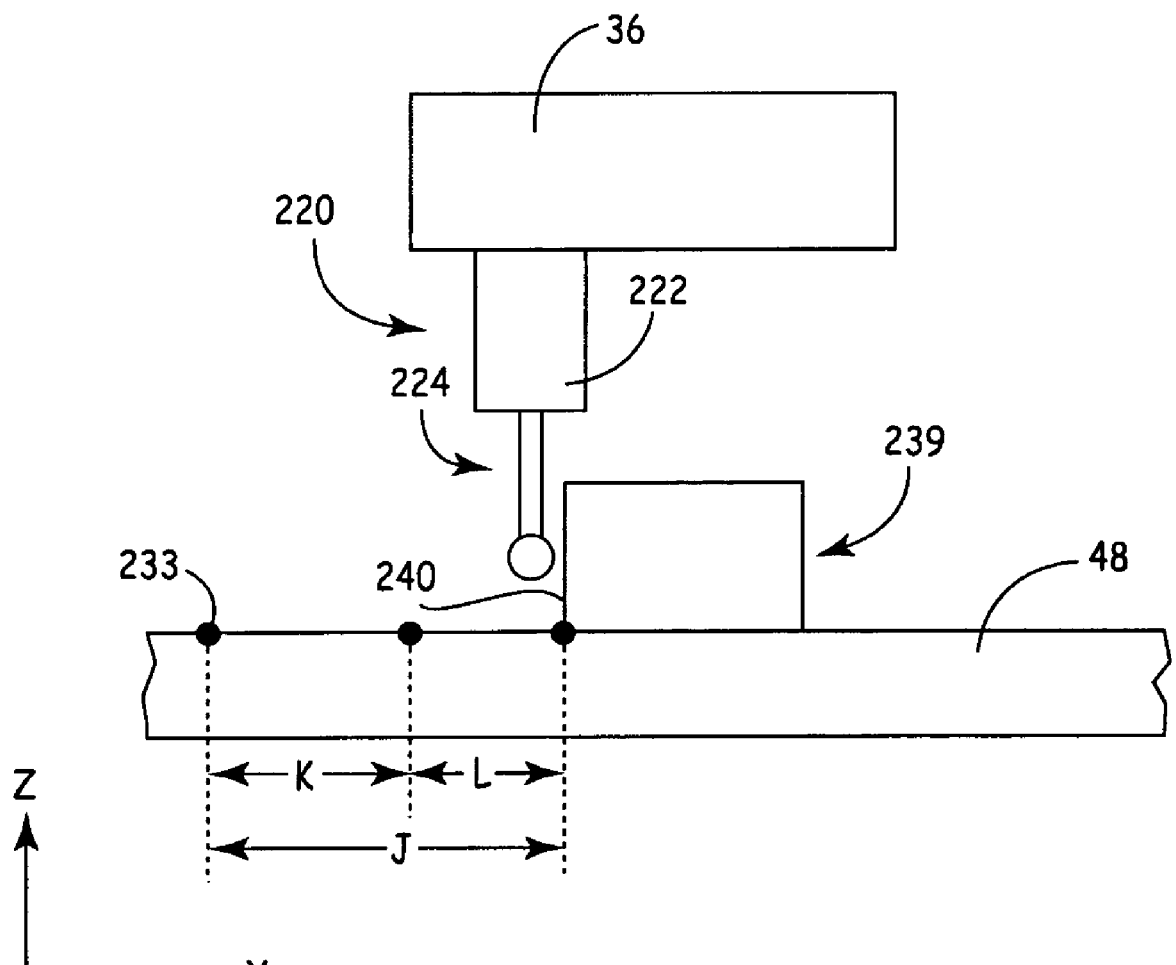
FIG. 10 is a side view of the sensor assembly of FIG. 9 sensing a side surface of the model pad and the support pad.

FIG. 10 illustrates the method 100 of the present invention for an X-axis tip-to-origin calibration. As shown in FIG. 10, material extrusion tip 38 has deposited build material 43 in a defined shape and size to generate the material build profile of step 102. In particular, the material build profile is shown as model pad 239. The pad 239 is positioned to the right of a predetermined X-Y axis origin 233 on substrate 48. Origin 233 serves as a reference point from which to measure relative positions of pad 239 in order to perform a tip-to-origin calibration.

The calibration routine continues at step 104 where the relative position of pad 239 is determined. In this example, side 240 of pad 239 lies parallel to the Y-axis and its relative position to origin 233 along the X-axis is determined by sensing side 240 of pad 239 with multi-axis sensor assembly 220. The relative position of side 240 is determined to be a distance J relative to origin 233 along the X-axis. The expected build profile is identified next in step 106. In an X-axis tip-to-origin calibration, the expected build profile can be provided to or determined by the controller 24 as the expected X-axis position of side 240. The expected X-axis position of side 240 has been identified in FIG. 10 as a distance K from origin 233. As illustrated in FIG. 10, the expected position of side 240 of pad 239 was closer to the origin 233 represented by the distance K than the actual material build profile of side 240 represented by the distance J. In other words, the actual position of the tip 38 along the X-axis is further from the origin 233 than expected by controller 24. The offset in step 108 of the method is then determined by the difference between the distances J and K which is identified as distance L in FIG. 10. The distance L is used to determine or derive the offset necessary to properly position model extrusion tip 38 with respect to origin 233, or the X-axis tip-to-origin offset for the tip 38. Once the tip 38 has been properly positioned with respect to the origin 233 instep 110 by accounting for the offset corresponding to the distance L, tip 38 has been calibrated in the X-direction with respect to origin 233, or the X-axis tip-to-origin calibration has been completed. In this embodiment, the calibration routine 100 determines the X-axis tip-to-origin offset within a tolerance of about 0.001 inches.

This same calibration routine may be applied to calibrate the Y-axis tip-to-origin offset of model extrusion tip 38 relative to origin 233 by comparing an expected Y-axis position of a second side of pad 239 that is perpendicular to side 240 or that lies parallel to the X-axis with an actual position of the second side. Additionally, in a multiple tip system such as modeling system 10, calibration method 100 may be applied in a similar manner to calibrate the X-axis and Y-axis positions of support extrusion tip 40 relative to origin 233 on substrate 48. Thus, an X-axis and Y-axis tip-to-origin offset calibration for a modeling system utilizing any number of tips is within the intended scope of this invention. In a multiple tip modeling system, such as modeling system 10, a tip-to-tip offset for the X-axis and Y-axis may also be performed to properly position additional tips rather than performing a tip-to-origin calibration for each of the additional tips.

Figure 11:
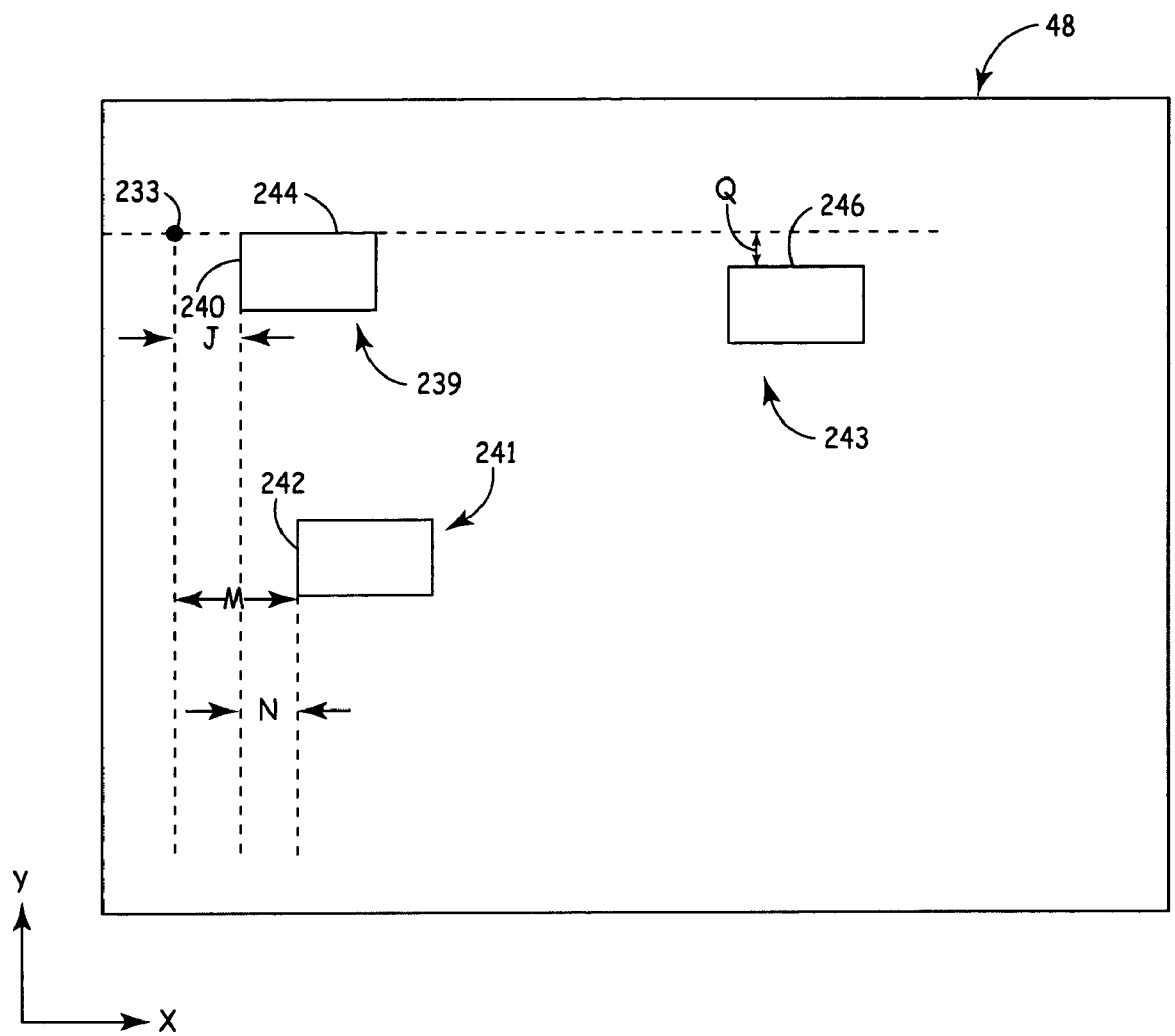
FIG. 11 is a top view of the model pad and the support pad on a substrate.

FIG. 11 illustrates the method 100 of the present invention for an X-axis tip-to-tip offset. As shown in FIG. 11, the same pad 239 comprising build material 43 5 from FIG. 10 remains on substrate 48. In step 102 of the calibration method 100, the modeling system 10 generates a pad 241 similar to the pad 239, except that pad 241 is constructed with support material 41 by extrusion tip 40, rather than build material 43 by extrusion tip 38. When directing the building of pad 241, controller 24 varies the Y-axis position of extrusion head 36 but maintains the same X-axis position to create side 240 1 0 of pad 239 and side 242 of pad 241 along the same X-axis coordinate relative to origin 233 on substrate 48. The origin 233 again serves as a reference point from which to measure the relative positions of the material pads in order to perform the tip-to-tip calibration.

The calibration routine continues at step 104 where the relative position 15 of pad 241 with respect to the origin 233 is determined. In this example, the side 242 of pad 241 relative to origin 233 is determined by sensing side 242 of pad 241 with multi-axis sensor assembly 220. As illustrated in FIG. 11, side 242 is a distance M away from the origin 233 along the X-axis.

The expected build profile is identified next in step 106. Since this is an 20 X-axis tip-to-tip calibration, the expected build profile is identified by determining the relative position of a second structure preferably created along the same X-axis position as side 242 but generated by the other tip, which in this case is tip 38. In this example, the pad 239 created by tip 38 and the pad 241 created by the tip 40 were attempted to be built by the controller 24 along the same X-axis position relative to origin 233. 25 Since the pad 239 has already been created and its relative position determined in the X-axis tip-to-origin calibration, the relative position J of the expected build profile from the origin 233 called for in step 106 has already been identified. Distance J of the pad 239 serves as the expected position in step 106 because the modeling system 10 attempted to build the side 242 of the pad 241 along the same X-axis position as the side 240 of the pad 239. As illustrated in FIG. 11, distance M of the material build profile when compared to the distance J of the expected build profile is further away from origin 233 in the X-direction by a distance N. The distance N represents the relative difference in the X-axis position of tip 38 compared to the tip 40 when each are placed into the extrusion position of the modeling system 10. Given that distance M is greater than distance J, tip 40 is further away from origin 233 than tip 38 in the X-direction when in the extrusion position. As a result, the offset between tips 38 and 40 along the X-axis is determined by or derived from the distance N.

The modeling system 10 will then adjust the position of the extrusion head 36 to account for the X-axis tip-to-tip offset when the controller 24 toggles between tips 38 and 40. In this example, the modeling system 10 would move the tip 40 closer to origin 233 by an amount determined or derived from the distance N. In an embodiment of the invention, the calibration routine 100 determines the X-axis tip-to-tip offset with a tolerance of about 0.001 inches.

FIG. 11 also illustrates the method 100 of the present invention for a Y-axis tip-to-tip offset. In this example, the modeling system 10 generates a pad 243 similar to the pad 239, except that pad 243 is constructed by tip 40 with support material 41 rather than tip 38 with build material 43. The modeling system 10 preferably builds pad 243 by varying the X-axis position of extrusion head 36 but holds the Y-axis position constant in an attempt to create a Y-side 244 of the pad 239 and a side 246 of the pad 243 along the same Y-axis coordinate relative to origin 233. As shown in FIG. 11, side 244 of pad 239 is located along or at the same Y-axis position as origin 233.

Similar to the discussion above with regard to the X-axis tip-to-tip offset, the Y-axis tip-to-tip calibration routine continues at step 104 where the relative position of side 246 of pad 243, which represents the material build profile, is determined. In this example, the relative position of side 246 of pad 243 relative to origin 233 is determined by sensing the side 246 of pad 243 with the multi-axis sensor assembly 220. The distance Q represents the relative distance between the side 246 and the origin 233. The expected build profile is identified next in step 106. Since this is a Y-axis tip-to-tip calibration, the expected build profile is once again identified by determining the relative position of a second structure preferably attempted to be created along the same Y-axis position as side 246 but generated by the other tip, which in this case is tip 38.

The specific derivation for the Y-axis tip-to-origin offset of pad 239 and specifically side 244 was not discussed in detail above due to its similarity to the X-axis tip-to-origin offset. For purposes of example, and as indicated in FIG. 11, side 244 is located along the same Y-axis position as the origin 233. As a result, the expected build profile relative position called for in step 106 is represented by side 244 that is located along the same Y-axis position as the origin 233. As illustrated in FIG. 11, distance Q then also represents the difference between the material build profile and the expected build profile for the Y-axis and thus the offset for the tip-to-tip calibration along the Y-axis. The distance Q represents the relative difference in the Y-axis position of tip 38 compared to the tip 40 when each are placed into the extrusion position of the modeling system 10. Given that distance Q is further away from the expected build profile, or the Y-axis position of the origin 233 in this example, tip 40 is further away from origin 233 than tip 38 in the Y-direction when in the extrusion position. As a result, the distance Q represents the Y-axis tip-to-tip offset between tips 38 and 40.

The modeling system 10 will adjust the position of the extrusion head 36 to account for the Y-axis tip-to-tip offset when the controller 24 toggles between tips 38 and 40. In this example, the modeling system 10 would move the tip 40 closer to the origin 233 by an amount determined or derived from the distance Q. In an embodiment of the invention, the calibration routine 100 determines the Y-axis tip-to-tip offset with a tolerance of about 0.001 inches.

While the X-Y axis origin 233 was shown near model material pad 239, origin 233 could have been placed anywhere on substrate 48, including a starting build path coordinate of one of the pads of material or the edges of the substrate 48 itself without departing from the spirit or scope of this invention. The origin 233 was shown in the upper left corner of substrate 48 in FIG. 11 solely for purposes of example.

Figure 12:
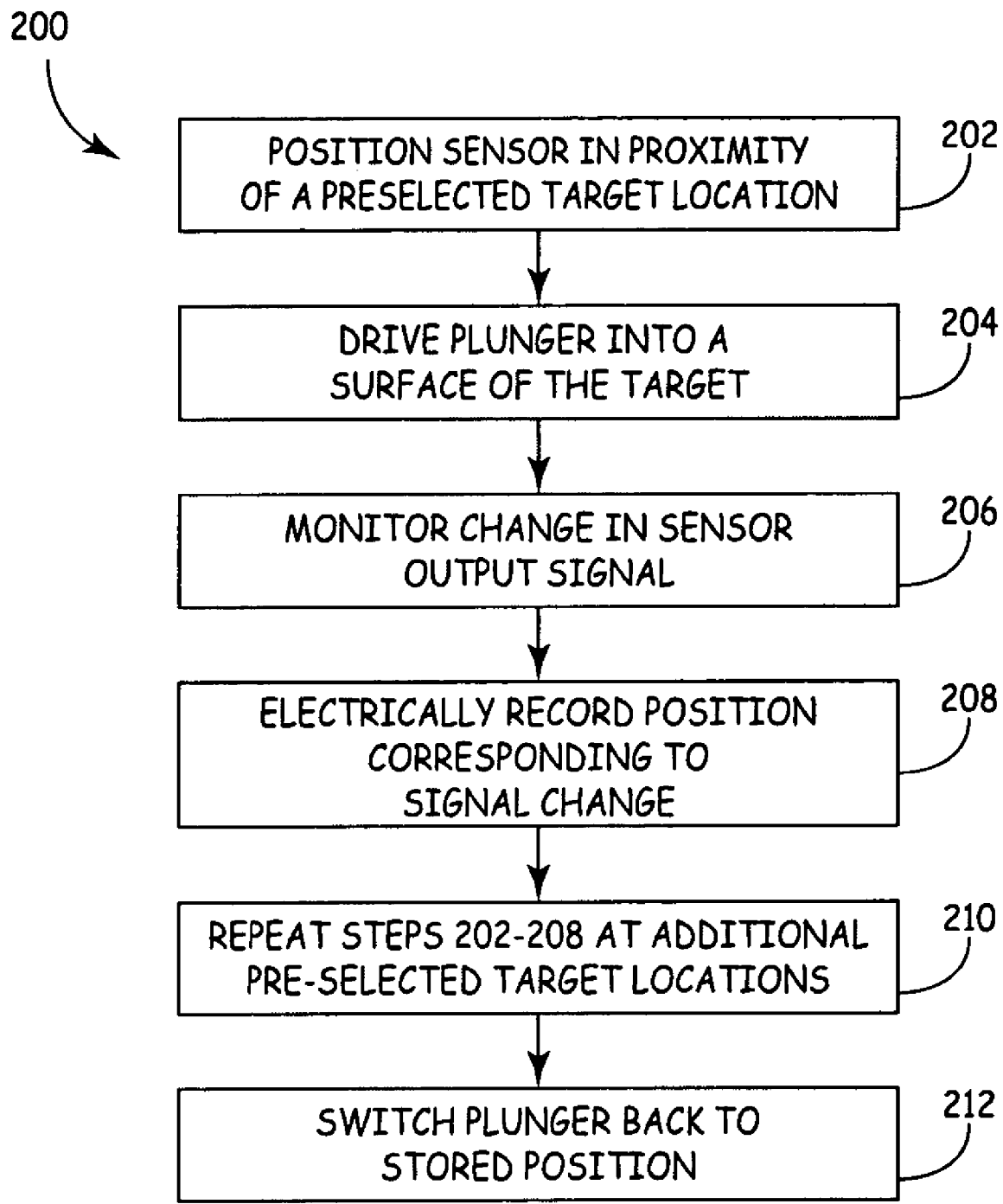
FIG. 12 is a process flow diagram illustrating the steps executed in sensing a surface of an object by the modeling system.

Referring now to the process flow diagram of FIG. 12, there is described a preferred method of sensing a surface (top or side) of an object that can be used in determining the relative position of the material build profile, or identifying the expected build profile by determining the X, Y, and Z-axis locations of the substrate 48 and the pads 49 and 51 as called for in steps 104-106 of the calibration routine 100. Determining the X, Y, and Z-axis locations of steps 104-106 begins by lowering the plunger 224 (or alternatively, plunger 54) into its lowered or sensing position in step 202, as previously described with reference to plunger 54 in FIGS. 6A and 6B. The sensor 225 (or sensor 79) is then positioned in proximity of the target, such as the model pad 51, at a first pre-selected location to locate a surface of the model pad 51 in step 204. For a square or rectangular model pad, a preferred location is towards one of the four corners of the surface. Step 204 drives the tip 232 (or tip 83) of the plunger 224 (or plunger 54) into the surface of the model pad 51. Next, in step 206 the output of the sensor 225 (or sensor 79) is monitored to detect movement of the plunger 224 (or plunger 54). The controller 24 monitors the signal line 238 (or signal line 68) for a change in its state or condition. A change in the state or condition of the signal signifies that the plunger 224 has broken the electrical connection between rod members 226 and electrical contacts 228 (or alternatively, that plunger 54 has moved the predetermined distance X into the beam of light 81). In step 208, controller 24 electrically records in memory 22 the position corresponding to the time at which the output signal of the signal line 238 (or signal line 68) changed.

Step 210 repeats steps 202 through 208 at a plurality of additional pre-selected locations for the target. In one embodiment, where the material build profile is pad 51 that has a square or rectangular shape, steps 202 through 208 are repeated in the vicinity of each of the corners of the square or rectangle as well as at the mid-point of the surface of the model page 51, to obtain a total of five recorded surface positions corresponding to five different coordinates.

To improve accuracy, additional measurements may be taken at the same or different locations on the surface of the model pad 51. In one embodiment, two measurements are taken at each of the five different coordinates, for a total of ten recorded positions. Upon completing the desired measurements or sensing, the plunger 224 (or plunger 54) is returned to its stored position in step 212. While the method of steps 202-212 is described with respect to the pad 51, the dimensions of the pad 49 or the substrate 48 or any other material build profile or expected build profile could also be determined.

After all of the relative positions are sensed and recorded for the determination of a particular dimension or location, controller 24 calculates an average of all positions corresponding to the sensing of the surface that were recorded during the performance of the method 200 described above. Controller 24 then uses those calculated averages in order to determine the relative position of the material build profile or expected build profile. Controller 24 may use the following algorithm to determine the average position that corresponds to the location that the target is sensed:

(1) Calculate the average position of the target touchdown points (target average) by adding all of the positions recorded in step 208 of FIG. 12 and dividing by the total number of recorded points, in this example there are ten points.
(2) Then, compare each of the recorded positions to the average value. If the recorded position with the maximum error from the calculated average is outside of an acceptable range about the average, then throw away that position and recalculate the average.
(3) If a recorded position was discarded, repeat the compare step with the remaining positions.
(4) Repeat the compare and discard steps until either of the following two conditions occur:
   The maximum error of the remaining positions is within the acceptable range; or
   The number of positions to be averaged falls below an acceptable level, or in this example below seven points.

The acceptable range about the average value amount that is used to compare the positions is about 0.001 inches for the X, Y, and Z-axis tip-to-tip calibrations, about 0.001 inches for the X-axis and Y-axis tip-to-origin calibrations, and about 0.012 inches for the Z-axis tip-to-substrate calibrations.

Depending upon the required accuracy of the modeling system, the acceptable range that is used for comparison may be larger or smaller. Furthermore, the acceptable range may be modified by the operator to adjust the accuracy of the calibration. It will be apparent to those skilled in the art that the above algorithm is but one example of an algorithm that may be used for determining the average position for the target based upon the recorded positions of the target using the method of the present invention.

In an embodiment of the invention, calibration of the extrusion tips 38 and 40 is achieved by initially sensing the top surface 60 of the substrate 48. This establishes the baseline for future reference in identifying the relative heights of the material build profile and the expected build profile while performing a Z-axis calibration, which in this case, represent pads 49 and 51. The layers of material which make up pads 49 and 51 are also preferably created or deposited by their respective extrusion tips 40 and 38 as part of the same build path, or prior to the controller 24 lowering the platform 46 for the next layer of material to be deposited. Once the pads 49 and 51 are created, the controller 24 can determine their respective dimensions by sensing their top and side surfaces with sensor assembly 220 or 53 at specific, defined locations. The controller 24 can then process the information to confirm the proper height and placement of the pads 49 and 51 at the specific defined coordinates and identify any offset required for the extrusion tips 38 and 40 with respect to the substrate 48 as well as the other extrusion tip 40 and 38, respectively. As a result, the modeling system 10 automatically calibrates its extrusion tips 38 and 40 without requiring measuring or involvement by the operator.

Although the above discussion has focused on sensor assemblies 53 and 220, these sensor assemblies represent only two possible embodiments of a sensor assembly that may be used in the calibration method of the present invention. Those skilled in the art will recognize that many other embodiments of a sensor assembly are possible which may be used interchangeably with sensor assemblies 53 or 220. Particularly, sensor 79 may be interchanged with any sensing means that can detect and signal contact between plunger 54 and another surface, and need not be limited to an optical sensor. In other embodiments, sensor assemblies 53 or 220 may, for example, use a magnet proximity switch, a Hall sensor, a Wiegand wire, a reed switch, a capacitive sensor or an inductance sensor. Likewise, plunger 54 or 224 may be interchanged with any plunging means that can be driven a predetermined distance by force of contact with a surface such as a cam, pawl, cantilever, screw, or membrane, or other mechanical structure. Or, contact between the plunger 54 and the model pad 51, the support pad 49, or the substrate 48 can be sensed at their initial contact, in which case the plunging means need not move in response to contact with the various surfaces.

In addition, numerous other sensor technologies may be interchanged with sensor assemblies 53 and 220 without affecting the accuracy of the calibration including, but not limited to, an atomic force microscope (AFM), a thermal probe, or an air gage. Typically, an AFM monitors the resonant frequency of a vibrating mechanical stylus to sense contact with a surface. Thermal probes generally include a heated thermocouple that is monitored as it is moved toward a surface. When the thermocouple gets close to the surface, the temperature drops due to a lower thermal resistance of the surface as compared to the surrounding air, thereby indicating contact with the surface.

Air gages typically measure air flow or back pressure through a nozzle to sense the position of a surface and could also be used.

Although the calibration method 100 of the present invention has been previously discussed in reference to determining a relative position of a pad of material generated by modeling system 10, the calibration method 100 may also be used in conjunction with a prefabricated pad. The prefabricated pad or pads of material can be attached to a fixture at precise, known positions. The fixture is then placed on top of platform 46 or substrate 48 in step 102 of the calibration method 100.

FIG. 13A illustrates the method 100 of the present invention using a plurality of prefabricated pads on a fixture placed on top of substrate 48. As shown in FIG. 13A, fixture 260 is placed inside modeling envelope 44 on top of substrate 48 such that corner 262 of fixture 260 matches-up with origin 264 of modeling system 10. Attached to fixture 260 is first calibration standard 266, second calibration standard 268, and third calibration standard 270. The calibration standards are prefabricated pads of material that are precisely positioned at known distances from corner 262 of fixture 260. Although calibration standards 266, 268, and 270 are shown as squares, they may be formed as numerous other shapes, such as rectangles or circles, without departing from the spirit and scope of the present invention.

As shown in FIG. 13A, calibration method 100 maybe used to calibrate an X-axis tip-to-origin offset by measuring a known distance R between side 272 of first calibration standard 266 and origin 264, and comparing the measured value with the known, expected value. The expected value of R is known because side 272 was positioned at a precise X-axis location relative to origin 264. If the measured and expected values of R are exactly the same, then no X-axis tip-to-origin offset exists. However, if there is a difference between the measured and expected values of distance R, then there exists an X-axis tip-to-origin offset that must be taken into account as previously discussed. This offset is used to determine or derive the offset necessary to correct movement or position of the extrusion head with respect to origin 264.

Additional calibration standards such as standards 268 and 270 may also be placed on fixture 260 to calibrate along the desired axis across the entire area of substrate 48. For example, an X-axis tip offset for calibration standard 268 may be identified by measuring a known distance S between side 274 of second calibration standard 268 and origin 264, and comparing the measured value with the expected value which is known based on the prefabricated layout and construction of the fixture 260. If a difference exists, it may be used to determine or derive the offset necessary to correct the movement or position of the extrusion head within modeling envelope 44.

As shown in FIG. 13A, calibration method 100 may be used to calibrate a Y-axis tip-to-origin offset by measuring a known distance T between side 276 of first calibration standard 266 and origin 264, and comparing the measured value with the known, expected value. Once again, the expected value of T is known because side 276 was positioned at a precise Y-axis location relative to origin 264. If the measured and expected values of T are exactly the same, then no Y-axis tip-to-origin offset exists. However, if there is a difference between the measured and expected values of distance T, then there exists a Y-axis tip-to-origin offset that should be determined or derived to correct the movement or position of the extrusion head with respect to origin 264.

Again, the calibration method 100 may be used to calibrate a Y-axis tip offset at another location within the modeling envelope 44 or a different location with respect to the substrate 48. For example, a Y-axis tip offset for calibration standard 270 may be identified by measuring a known distance U between side 278 of third calibration standard 270 and origin 264, and comparing the measured value with the expected value which is known based on the prefabricated layout and construction of the fixture 260. If a difference exists, it may be used to determine or derive the offset necessary to correct the movement or position of the extrusion head within modeling envelope 44.

Figure 13B:
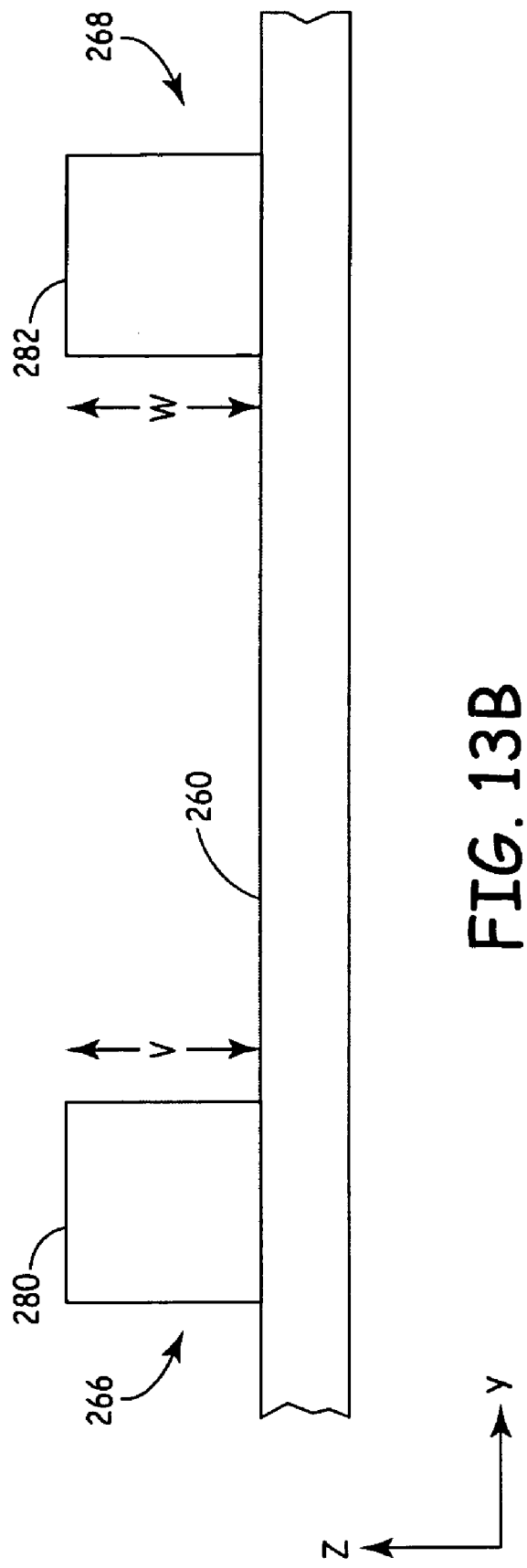
FIG. 13B is a side view of the prefabricated fixture.

FIG. 13B illustrates a Z-axis tip calibration according to the method 100 using first calibration standard 266 and second calibration standard 268. As shown in FIG. 13B, fixture 260 is placed inside modeling envelope 44 as described above in reference to FIG. 13A. In addition to being positioned at precise, known locations on fixture 260, calibration standards 266 and 268 were prefabricated such that their heights relative to fixture 260 are precisely known.

Calibration method 100 may be used to calibrate a Z-axis tip-to-reference point offset by measuring a known height V between top 280 of first calibration standard 266 and fixture 260, and comparing the measured value with the known, expected value. In this instance, a top surface of fixture 260 may represent the reference point. The expected value of V is known because first calibration standard 266 was prefabricated with a precise, known height. If the measured and expected values of V are exactly the same, then no Z-axis tip-to-origin offset exists. However, if there is a difference between the measured and expected values of distance V, then there exists a Z-axis tip-to-origin offset that should be taken into account. This offset is used to determine or derive the offset necessary to correct the movement or positioning of the extrusion head with respect to an origin or a reference point, such as substrate 48.

Again, the calibration method 100 may be used to calibrate a Z-axis tip offset at another location within the modeling envelope 44 at a different location with respect to the substrate 48. For example, a Z-axis tip offset for calibration standard 268 may be identified by measuring a known height W and comparing the measured value with the expected value, which is known based on the prefabricated layout and construction of the fixture 260. If a difference exists, it may be used to determine or derive the offset necessary to properly correct the movement of the extrusion tip within modeling envelope 44.

Those skilled in the art will recognize that deviations from the particular order of steps or the structures of the embodiments shown and described herein may be implemented or used in practice of the present invention. For example, although the above discussion focused on a modeling system that utilizes two extrusion tips, a system that utilizes either more or less than two tips is also within the scope of this invention. Additionally, one skilled in the art would understand that in a modeling system having a dispensing head movable along the Z-axis, the plunger could be driven upward in the method of the present invention by lowering the dispensing head instead of raising the modeling platform. Additionally, the automatic calibration routine of the present invention may be used as part of a three-dimensional modeling system to calibrate a single axis without departing from the spirit and scope of the invention. Thus, although the present invention has been described with reference to preferred embodiments workers skilled in the art will recognize that changes may be made in form and detail without departing from the spirit and scope of the invention.

The invention claimed is:

1. A method for performing a calibration routine in a three-dimensional modeling machine having a substrate and an extrusion head that includes a first extrusion tip and a second extrusion tip, the method comprising:
   biasing a plunger of a multi-axis sensor assembly operably against a plurality of electrical contacts of the multi-axis sensor assembly;
   generating a first material build profile on the substrate with the first extrusion tip;
   toggling the extrusion head such that the second extrusion tip is lower than the first extrusion tip;
   generating a second material build profile on the substrate with the second extrusion tip;
   contacting top surfaces of the first and second material build profiles with the plunger to move the plunger with respect to a housing of the multi-axis sensor assembly, wherein each movement of the plunger disengages the plunger from at least one of the plurality of electrical contacts;
   determining relative positions of the top surfaces of the first and second material build profiles in relation to a reference position based on the disengagement of the plunger from the at least one electrical contact; and
   determining a vertical tip-to-tip offset based on a difference between the relative positions of the top surfaces.

2. The method of claim 1, and further comprising:
   identifying an expected build profile defining an expected position of the top surface of the first material build profile;
   comparing the relative position of the top surface of the first material build profile to the expected position to determine a vertical tip-to-substrate offset; and
   positioning the substrate based upon the vertical tip-to-substrate offset.

3. The method of claim 1, wherein the movement of the plunger with respect to the housing comprises a tilting movement of the plunger with respect to the housing.

4. The method of claim 1, and further comprising adjusting a position of the substrate to account for the vertical tip-to-tip offset when the extrusion head subsequently toggles between the first extrusion tip and the second extrusion tip.

5. The method of claim 1, wherein the movement of the plunger with respect to the housing comprises a movement of the plunger in an opposing direction to the bias.

6. The method of claim 1, and further comprising securing the housing of the multi-axis sensor assembly to the extrusion head.

7. The method of claim 1, and further comprising:
   contacting a second surface of the first material build profile with the plunger to tilt the plunger with respect to the housing, wherein the tilting of the plunger disengages the plunger from at least one of the plurality of electrical contacts; and
   determining a relative position of the second surface of the first material build profile in relation to a second reference position based on the disengagement of the plunger from the at least one electrical contact due to the tilting of the plunger.

8. The method of claim 1, wherein the electrical contacts are arranged circumferentially around the plunger.

9. A method for performing a calibration routine in a three-dimensional modeling machine having a substrate and an extrusion head that includes a first extrusion tip and a second extrusion tip, the method comprising:
   building a first build profile with the first extrusion tip while the second extrusion tip is in a raised position;

contacting a top surface of the first build profile with a plunger of a sensor assembly to determine a height of the top surface of the first build profile relative to the substrate;

toggling the extrusion head such that the second extrusion tip is lower than the first extrusion tip;

building a second build profile with the second extrusion tip of the extrusion head while the second extrusion tip is in a lowered position;

contacting a top surface of the second build profile with the plunger of the sensor assembly to determine a height of the top surface of the second build profile relative to the substrate;

determining a vertical tip-to-substrate offset based on a difference between the height of the top surface of the first build profile and an expected height; and determining a vertical tip-to-tip offset based on a difference between the heights of the top surfaces.

10. The method of claim 9, wherein the sensor assembly comprises a multi-axis sensor assembly, and wherein the method further comprises biasing the plunger operably against a plurality of electrical contacts of the multi-axis sensor assembly.

11. The method of claim 10, wherein the movement of the plunger with respect to the housing comprises a tilting movement of the plunger with respect to the housing.

12. The method of claim 9, and further comprising contacting a second surface of the first build profile with the plunger of the sensor assembly to determine a relative position of the second surface of the first build profile in relation to a reference position.

13. The method of claim 12, and further comprising contacting a second surface of the second build profile with the plunger of the sensor assembly to determine a relative position of the second surface of the second build profile in relation to a second reference position.

14. The method of claim 9, and further comprising positioning the substrate based upon the vertical tip-to-substrate offset.

15. The method of claim 9, and further comprising adjusting a position of the substrate to account for the vertical tip-to-tip offset when the extrusion head subsequently toggles between the first extrusion tip and the second extrusion tip.

16. A method for performing a calibration routine in a three-dimensional modeling machine having a substrate and an extrusion head that includes a first extrusion tip and a second extrusion tip, the method comprising:

depositing a first material from the first extrusion tip while the first extrusion tip is lower than the second extrusion tip to provide a first build profile on the substrate;

contacting a top surface of the first build profile with a plunger of a sensor assembly to determine a height of the first build profile relative to the substrate;

depositing a second material from the second extrusion tip while the second extrusion tip is lower than the first extrusion tip to provide a second build profile on the substrate;

contacting a top surface of the second build profile with the plunger of the sensor assembly to determine a height of the second build profile relative to the substrate;

determining a vertical tip-to-substrate offset based on a difference between the height of the top surface of the first build profile and an expected height; and determining a vertical tip-to-tip offset based on a difference between the heights of the top surfaces.

17. The method of claim 16, wherein the sensor assembly comprises a multi-axis sensor assembly, and wherein the method further comprises biasing the plunger operably against a plurality of electrical contacts of the multi-axis sensor assembly.

18. The method of claim 16, and further comprising contacting a second surface of the first build profile with the plunger of the sensor assembly to determine a relative position of the second surface of the first build profile in relation to a reference position.

19. The method of claim 16, and further comprising positioning the substrate based upon the vertical tip-to-substrate offset.

20. The method of claim 16, and further comprising adjusting a position of the substrate to account for the vertical tip-to-tip offset when the extrusion head subsequently toggles between the first extrusion tip and the second extrusion tip.

* * * * *